(12) United States Patent
Tin

(10) Patent No.: US 9,367,909 B2
(45) Date of Patent: Jun. 14, 2016

(54) DEVICES, SYSTEMS, AND METHODS FOR CLASSIFYING MATERIALS BASED ON A BIDIRECTIONAL REFLECTANCE DISTRIBUTION FUNCTION

(71) Applicant: CANON KABUSHIKI KAISHA, Tokyo (JP)

(72) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 240 days.

(21) Appl. No.: 14/149,515

(22) Filed: Jan. 7, 2014

(65) Prior Publication Data

US 2015/0016711 A1    Jan. 15, 2015

Related U.S. Application Data

(60) Provisional application No. 61/844,797, filed on Jul. 10, 2013.

(51) Int. Cl.
| | | |
|---|---|---|
| G01N 21/00 | (2006.01) | |
| G06T 7/00 | (2006.01) | |
| G06K 9/00 | (2006.01) | |
| G06K 9/20 | (2006.01) | |

(52) U.S. Cl.
CPC .......... G06T 7/0004 (2013.01); G06K 9/00577 (2013.01); G06K 9/2018 (2013.01); G06K 9/2036 (2013.01)

(58) Field of Classification Search
CPC .............. G01N 21/31; G01N 15/1475; G01N 2223/419; G01N 23/046; G01N 2015/008; G01N 2015/1488; G01N 21/274; G01N 21/474; G01N 21/51; G01N 2015/1006; G01N 2021/6423; G01N 2021/845; G01N 21/55
See application file for complete search history.

(56) References Cited

U.S. PATENT DOCUMENTS

| | | | |
|---|---|---|---|
| 3,747,755 | A | 7/1973 | Senturia |
| 6,496,594 | B1 | 12/2002 | Prokoski |
| 7,449,655 | B2 | 11/2008 | Cowling |
| 8,124,931 | B2 | 2/2012 | Andrews |
| 2006/0245632 | A1 | 11/2006 | Nisper |
| 2010/0080456 | A1 | 4/2010 | Paul |
| 2010/0289878 | A1 | 11/2010 | Sato |
| 2010/0290032 | A1 | 11/2010 | Bugge |

(Continued)

FOREIGN PATENT DOCUMENTS

| | | |
|---|---|---|
| EP | 0968772 A2 | 1/2000 |
| EP | 2187339 A1 | 5/2010 |

(Continued)

OTHER PUBLICATIONS

Karl Berger et al., Measuring BRDFs of immersed materials, Vision, Modeling, and Visualization, Aug. 2011.

(Continued)

*Primary Examiner* — Michael P Stafira
(74) *Attorney, Agent, or Firm* — Canon U.S.A., Inc. IP Division

(57) ABSTRACT

Systems, devices, and methods for classifying a sample by material type measure a reflection of a sample at an illumination angle and an observation angle in at least two spectral bands, calculate a feature value for the sample based on an estimated ratio value of the at least two spectral bands of the measured reflection, and classify the sample based on the feature value.

26 Claims, 25 Drawing Sheets

(56) References Cited

U.S. PATENT DOCUMENTS

| | | |
|---|---|---|
| 2011/0299104 A1 | 12/2011 | Seo |
| 2012/0170021 A1 | 7/2012 | Walsh |
| 2012/0253749 A1 | 10/2012 | Bernard |
| 2013/0093883 A1 | 4/2013 | Wang |

FOREIGN PATENT DOCUMENTS

| | | |
|---|---|---|
| GB | 2119509 A | 11/1983 |
| WO | 2013102858 A1 | 7/2013 |

OTHER PUBLICATIONS

Michael Goesele, IMPA Minicourse: Photometric Calibration of Digital Cameras for Image-Based Techniques, Max-Planck-Institut fur Informatik, Feb. 2005.

Jinwei Gu et al., Discriminative Illumination: Per-Pixel Classification of Raw Materials based on Optimal Projections of Spectral BRDF, CVPR 2012, Jun. 2012.

Hongyu Li et al., SR-LLA: A Novel Spectral Reconstruction Method Based on Locally Linear Approximation, Proc. ICIP, pp. 2029-2033, May 2013.

Shoji Tominaga et al., Metal-Dielectric Object Classification by Combining Polarization Property and Surface Spectral Reflectance, SPIE-IS&T/ vol. 8652, Feb. 2013.

Oliver Wang et al., Material Classification using BRDF Slices, CVPR 2009, Jun. 2009.

Artzai Picon, et al. "Fuzzy Spectral and Spatial Feature Integration for Classification of Nonferrous Materials in Hyperspectral Data", IEEE Transactions on Industrial Informatics, vol. 5, No. 4, Nov. 2009, pp. 483-494.

Karl Berger et al., Measuring BRDFs of immersed materials, Vision, Modeling, and Visualization (2011).

Michael Goesele, IMPA Minicourse: Photometric Calibration of Digital Cameras for Image-Based Techniques, Max-Planck-Institut fur Informatik, 2005.

Jinwei Gu et al., Discriminative Illumination: Per-Pixel Classification of Raw Materials based on Optimal Projections of Spectral BRDF, CVPR 2012.

Hongyu Li et al., SR-LLA: A Novel Spectral Reconstruction Method Based on Locally Linear Approximation, Proc. ICIP, pp. 2029-2033, 2013.

Chao Liu et al., Learning Discriminative Illumination and Filters for Raw Material Classification with Optimal Projections of Bidirectional Texture Functions, CVPR, Jun. 2013.

Chao Liu et al., Supplementary: Learning Discriminative Illumination and Filters for Raw Material Classification with Optimal Projections of Bidirectional Texture Functions, Jun. 2013.

Shoji Tominaga et al., Metal-Dielectric Object Classification by Combining Polarization Property and Surface Spectral Reflectance, SPIE-IS&T/ vol. 8652, 2013.

Oliver Wang et al., Material Classification using BRDF Slices, CVPR 2009.

DEVICES, SYSTEMS, AND METHODS FOR CLASSIFYING MATERIALS BASED ON A BIDIRECTIONAL REFLECTANCE DISTRIBUTION FUNCTION

CROSS-REFERENCE TO RELATED APPLICATIONS

This application claims priority to U.S. Provisional Application No. 61/844,797, which was filed on Jul. 10, 2013.

BACKGROUND

1. Technical Field

This description generally relates to material classification.

2. Background

The classification of materials (e.g., metal, plastic, ceramic, fabric, paint) may be useful in many research and industrial applications, such as remote sensing, food inspection, mineralogy, and recycling. However, some techniques that classify materials require physical contact with the sample, which can limit the applications that these techniques can be used for. The optical classification of materials in a sample may be useful in applications where contact is not possible. Also, the optical classification of materials in a sample may simplify the design of devices and systems that could also use contact to classify the materials.

SUMMARY

In one embodiment, a method for classifying a sample by material type comprises measuring a reflection of a sample at an illumination angle and an observation angle in at least two spectral bands, calculating a feature value for the sample based on an estimated ratio value of the at least two spectral bands of the measured reflection, and classifying the sample based on the feature value.

In one embodiment, a system for classifying a sample by material type comprises one or more computer-readable media; and one or more processors that are coupled to the one or more computer-readable media and that are configured to cause the system to measure a reflection of a sample at an illumination angle and an observation angle in at least two spectral bands, calculate a feature value for the sample based on an estimated ratio value of the at least two spectral bands of the reflection of the sample, and classify the sample based on the feature value.

In one embodiment, a method of classifying a sample by material type comprises capturing an image of a sample at an observation angle, wherein the sample is illuminated at an illumination angle in at least two spectral bands; measuring a respective reflection for each of a plurality of pixels in the image of the sample; calculating a respective feature value for each pixel based on a ratio value, wherein the ratio value is based on the at least two spectral bands of the reflection of the pixel; and classifying the sample based on the feature values.

DESCRIPTION

The following disclosure describes certain explanatory embodiments. Other embodiments may include alternatives, equivalents, and modifications. Additionally, the explanatory embodiments may include several novel aspects, and a particular aspect may not be essential to some embodiments of the devices, systems, and methods described herein.

Figure 1:
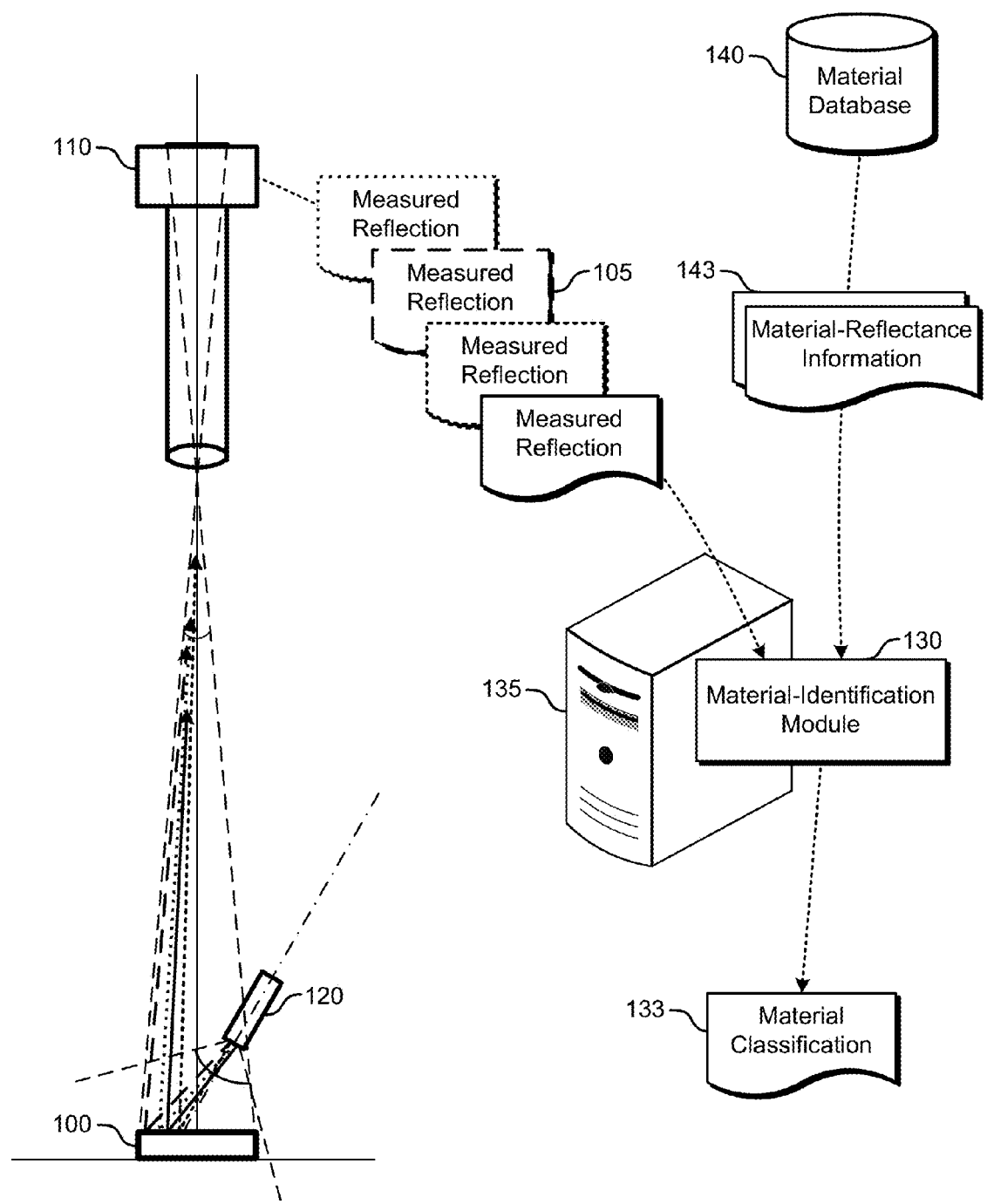
FIG. 1 illustrates an example embodiment of a system for material identification and the flow of operations in the system.

FIG. 1 illustrates an example embodiment of a system for material identification and the flow of operations in the system. The system includes a camera 110 (e.g., a multi-spectral camera 110), a projector 120 (e.g., a multi-channel projector 120), a computing device 135 that includes a material-identification module 130, and a material database 140. Modules include logic, computer-readable data, or computer-executable instructions, and may be implemented in software (e.g., Assembly, C, C++, C#, Java, BASIC, Perl, Visual Basic), hardware (e.g., customized circuitry), and a combination of software and hardware. In some embodiments, the system includes one or more additional modules or the module is divided into more modules. Though the computing device or computing devices that execute a module perform the operations, for purposes of description a module may be described as performing one or more operations.

The projector 120 illuminates a material sample 100 with light, and the camera 110 generates one or more captured images 105 (e.g., measured reflections 105) by detecting light that is emitted by the projector 120 and that is reflected by the material sample 100. The measured reflections 105 include measured reflections in two or more spectral bands and may be mostly specular reflections. The camera 110 sends the measured reflections 105 to a material identification module 130, which is being implemented by a computing device 135. The material identification module 130 obtains material-reflectance information 143 from a material database 140, which stores material-reflectance information 143 for different materials. Based on the measured reflections 105 and on the material-reflectance information 143, the material-identification module 130 generates a material classification 133 that indicates the material of the material sample 100.

The material-identification module 130 may generate the material classification 133 based on a bidirectional reflectance distribution function (BRDF), which describes the optical response (i.e., the reflection) of a material to incident light from different directions. Because the BRDF is a four-dimensional function of illumination (solid) angle and observation (solid) angle, typically only slices of it are measured, and a classifier is computed from these slices.

For example, some techniques construct a feature-value vector using 27 coefficients of a hemispherical harmonic series based on 64 BRDF slices (each slice requiring one capture, resulting in 64 captures) and a classifier (e.g., a support vector machine (SVM) classifier). These techniques also make corrections to the BRDF slices to account for the spatial variations of the surface normal. Also, some techniques, which require only two captures, do not recover the 150-dimensional feature-value vector, but instead optically capture the classifier (e.g., SVM classifier) directly. However, they require the surface normal to be spatially constant and known (e.g., pointing upwards). Additionally, some techniques assume a radiance model with two "KG" product terms, where the "K" term depends only on intrinsic material properties (e.g., diffuse and specular albedos, refractive index, surface roughness) and the "G" term depends only on the observation/illumination geometry and object shape, but not on the intrinsic material properties. These techniques generate a geometry invariant as a ratio of two determinants based on six measurements.

While these techniques require a large number of captures or limit the shapes of material samples (e.g., flat material samples), these techniques also construct a feature space directly from the BRDF slices. BRDF does not depend only on the material, but also on the surface condition. For example, for the same metal (e.g., aluminum), different surface finishes will result in different BRDFs. A smooth, mirror-like metal surface has a BRDF that is concentrated along the specular directions (i.e., looks like a delta function). A metal surface that is rough may behave more like a Lambertian surface (i.e., the BRDF is constant for all illumination angles and all observation angles).

Figure 2:
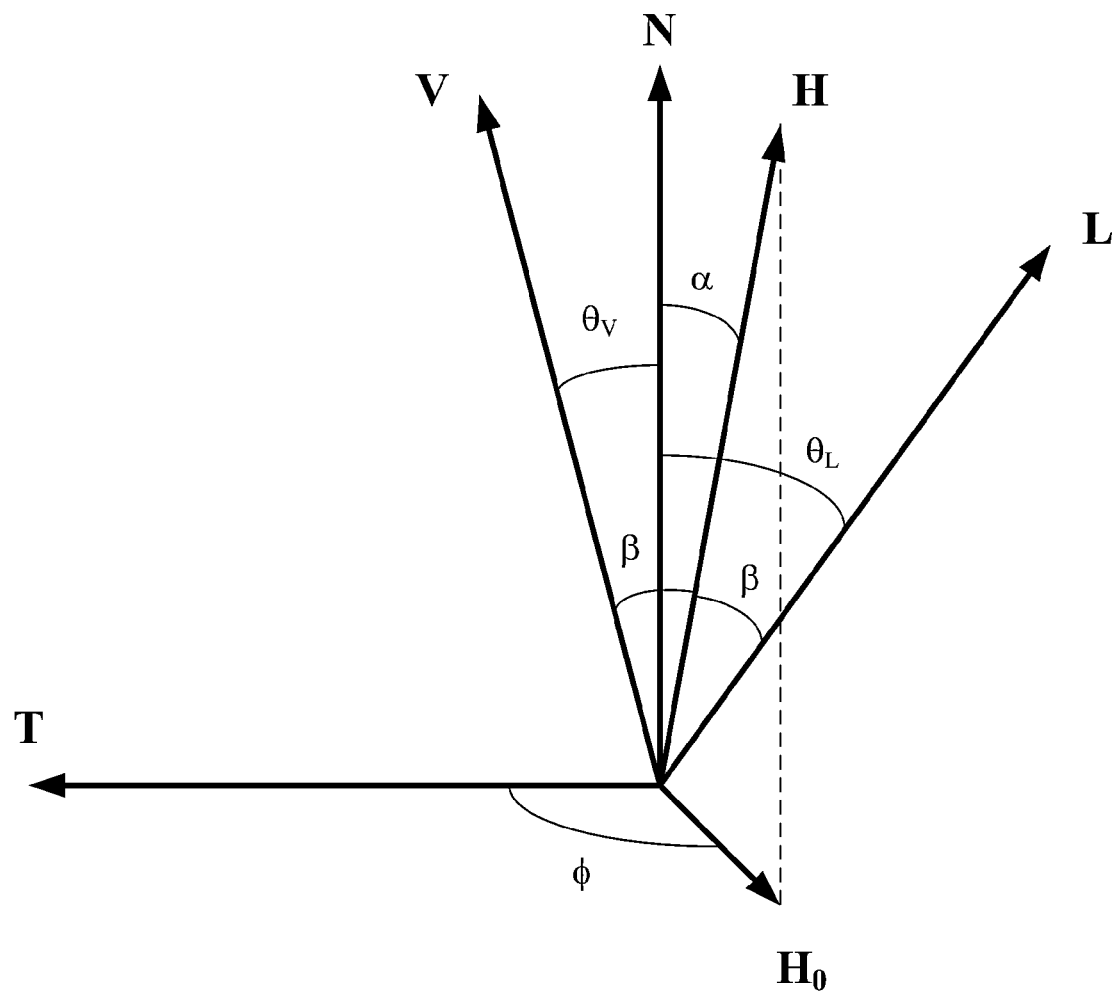
FIG. 2 illustrates the unit vectors and angles used in the description of a bidirectional reflectance distribution function (BRDF).

For example, consider a rather general model of a BRDF. FIG. 2 illustrates the unit vectors and angles used in the description of a BRDF. N is a surface-unit-normal vector, T is a reference-unit-tangent vector, L is an illumination-direction (lighting direction) unit vector, V is an observation-direction (viewing direction) unit vector, and H is a half-way vector. The half-way vector H, which is a unit vector, may be defined according to the following:

$$H = \frac{L+V}{\|L+V\|}. \quad (1)$$

$H_0$ is the projection of H onto the tangent plane. Also, it is convenient to express the angles in terms of their cosines, or equivalently, in terms of dot products of vectors:

$t = H \cdot N$ $u = H \cdot V$ $v = V \cdot N$ $l = L \cdot N$ $w = T \cdot H_0 / \|H_0\| \quad (2)$ A general BRDF model is given by the following equation:

$$R_\lambda(L, V) = \frac{d(m)}{\pi} C_\lambda + \frac{s(m)}{4\pi v l} F_\lambda(u) G(t, u, v, l, w, m) D(t, m), \quad (3)$$

where $d(m)+s(m)=1$, where $\lambda$ denotes wavelength, where m is a roughness parameter (e.g., describing the surface finishing of a metal sample), where t is the cosine of $\alpha$, where u is the cosine of the half-angle $\beta$, where v is the cosine of $\theta_V$, where l is the cosine of $\theta_L$, and where w is the cosine of $\phi$. However, this BRDF model is presented for illustrative purposes, and some embodiments of the systems, devices, and methods use other models instead of this model. The first term on the right side describes the diffuse reflection, where $C_\lambda$ is the spectral reflectance, while the second term on the right side describes the specular reflection. The physical origin of these terms may be different for different material types (e.g., metals and dielectrics have different physics of reflection). For metals, for example, specular reflection is a result of the scattering of light by moving electrons on the metal surface, and there is no subsurface phenomenon. The factors d(m) and s(m) describe the relative amounts of diffuse reflection and specular reflection, which depend on the roughness m of the surface.

A metal surface can be modeled by a microfacet model, which postulates a distribution of microscopic mirrors, or microfacets. Using this model, the diffuse reflection term (the first term in equation (3)) may arise from interreflections among the microfacets. Additionally, the specular reflection term (the second term in equation (3)) is composed of several factors. $F_\lambda(u)$ describes the Fresnel reflectance, which represents the reflectance of a perfect metallic mirror. The Fresnel reflectance $F_\lambda(U)$ is the only term that depends on wavelength $\lambda$. Also, the Fresnel reflectance $F_\lambda(u)$ depends on the incident angle, or equivalently the cosine of the incident angle, denoted by u. According to the microfacet model, specular reflection only happens for the microfacets whose (microscopic) normal aligns with the half-way vector. The proportion of such microfacets is determined by the distribution function D (t, m). Typically, this distribution is concentrated around t=0, when the half-way vector coincides with the macroscopic normal N. As roughness m increases, the distribution function D (t, m) spreads out, producing less pronounced specular reflection and a larger specular lobe for the BRDF. In many BRDF models, such as the Cook-Torrance model, the roughness m indicates the RMS slope of the microfacets. Finally, the geometric attenuation term G (t, u, v, l, w, m) indicates the masking and shadowing effects among the microfacets.

Thus, the Fresnel reflectance $F_\lambda(u)$ is the only component of the BRDF that contains information intrinsic to the material. The other terms describe the effect of roughness m on the BRDF. Following are specific forms of the geometric-attenuation term and the microfacet-slope-distribution function for the Cook-Torrance BRDF model. These forms are provided only as examples; the example embodiments of systems, devices, and methods described herein do not assume any specific BRDF model other than the general model given by equation (3). Additionally, the techniques for calculating the feature value may work for BRDF models that are more general than the general model described by equation (3). The geometric-attenuation term for the Cook-Torrance isotropic BRDF model is given by the following:

$$G(t, u, v, \ell, w, m) = \min\left(1, 2\frac{tv}{u}, 2\frac{t\ell}{u}\right). \quad (4)$$

Independence of this term on the cosine of the azimuthal angle w signifies isotropy. Independence from roughness m may be considered an inadequacy of the Cook-Torrance model. The microfacet-slope-distribution function is given by the Beckmann distribution function:

$$D(t, m) = \frac{1}{m^2 t^2} e^{\frac{t^2-1}{m^2 t^2}}. \quad (5)$$

Also, the Fresnel reflectance $F_\lambda(u)$ is well understood. For metals, it is based on the refractive index $n_\lambda$ and the extinction coefficient $k_\lambda$, both of which depend on the wavelength $\lambda$. For non-polarized light, $$F_\lambda(u) = \frac{1}{2}\frac{(a-u)^2 + b^2}{(a+u)^2 + b^2}\left[\frac{(a+u-u^{-1})^2 + b^2}{(a-u+u^{-1})^2 + b^2} + 1\right], \quad (6)$$

$$a^2 = \frac{1}{2}\left(\sqrt{(n_\lambda^2 - k_\lambda^2 + u^2 - 1)^2 + 4n_\lambda^2 k_\lambda^2} + n_\lambda^2 - k_\lambda^2 + u^2 - 1\right), \text{ and}$$

$$b^2 = \frac{1}{2}\left(\sqrt{(n_\lambda^2 - k_\lambda^2 + u^2 - 1)^2 + 4n_\lambda^2 k_\lambda^2} - n_\lambda^2 + k_\lambda^2 - u^2 + 1\right).$$

Figure 3:
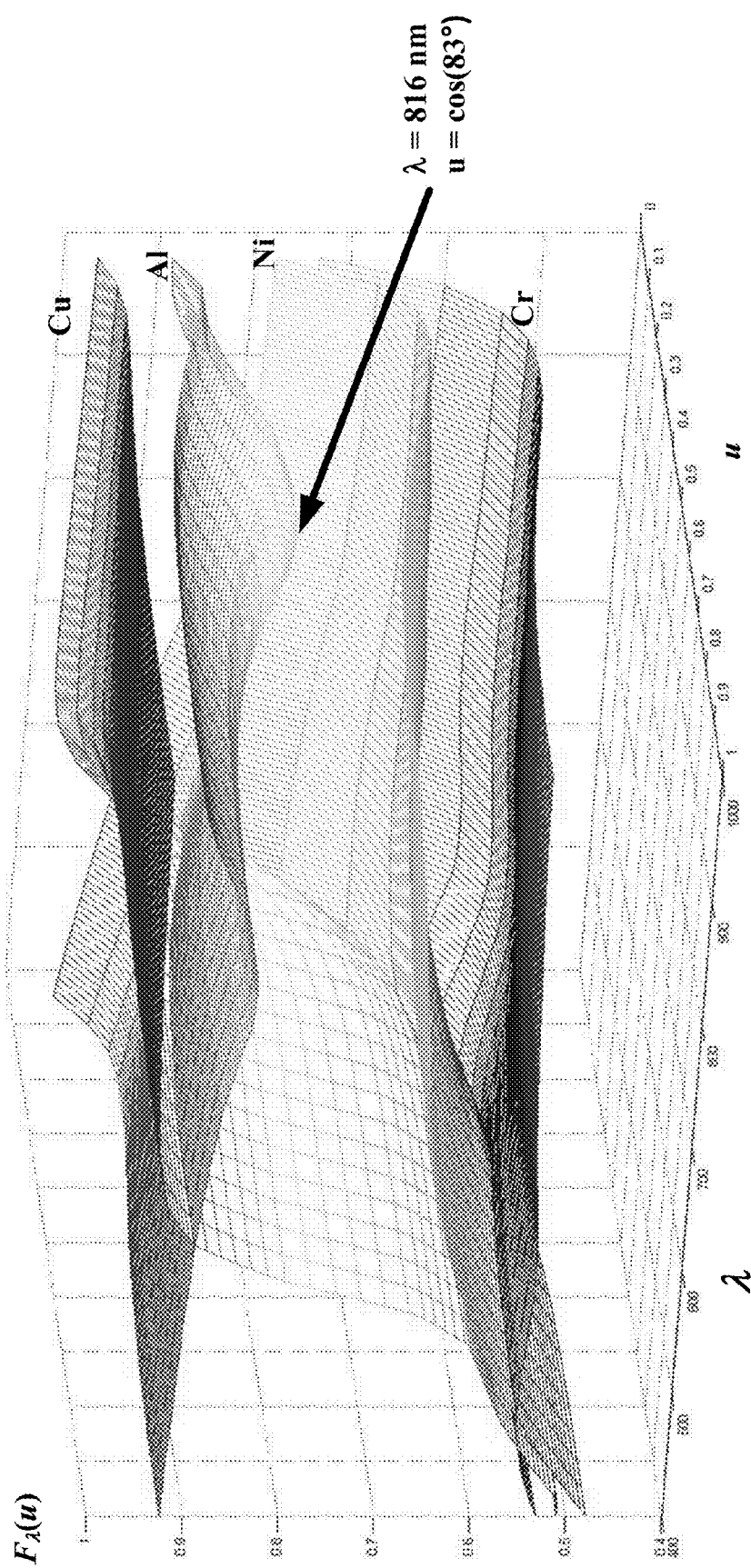
FIG. 3 illustrates examples of the Fresnel reflectance for several metals.

FIG. 3 illustrates examples of the Fresnel reflectance $F_\lambda(u)$ for several metals. FIG. 3 indicates that with a full tabulation of the Fresnel reflectance $F_\lambda(u)$ over the space of the cosine of the half angle u and of the wavelength $\lambda$, it is possible to classify or differentiate different metals. For example, a minimum reflectance for aluminum occurs at a wavelength of 816 nm and an incident angle of 83° (this incident angle's cosine u is 0.12). The wavelength $\lambda$ is in the near infrared range (NIR), but is a characteristic of aluminum.

However, isolating the Fresnel reflectance $F_\lambda(u)$ in the right side of equation (3) using BRDF measurements (the left side of equation (3)) is not straightforward. Nevertheless, embodiments of the system isolate a material feature that depends on the Fresnel reflectance $F_\lambda(u)$ (e.g., a ratio of Fresnel reflectances $F_\lambda(u)$), even though it may not be the Fresnel reflectance $F_\lambda(u)$ itself. For example, the wavelength dependence of the Fresnel reflectance $F_\lambda(u)$ for different metals allows the system to use the material feature that depends on the Fresnel reflectance $F_\lambda(U)$ to classify or differentiate the metals. In some embodiments, a material feature is a ratio of two measurements (e.g., measured reflections in two spectral bands) at a specular pixel.

In some example embodiments, the BRDF is measured in multiple spectral bands, for example N spectral bands, which generates a sampling of the BRDF at multiple illumination-angle/observation-angle combinations, for example M combinations, thereby producing the following measurements: $R_i(L_j, V_j)$; i=1, 2, . . . , N; j=1, 2, . . . , M.

A description of the choice of illumination/observation angle pairs $(L_j, V_j)$; j=1, 2, . . . , M, which are the sampling locations of the BRDF, is presented below. Note however that there is not a strict assumption about this sampling, such as uniform sampling. In some embodiments, the sampling is very sparse. Furthermore, in practice the illumination and observation angles may not be completely controllable because, in addition to depending on the location of the light source and the camera, the illumination and observation angles also depend on the shape of the sample being observed. In particular, the unit vectors $L_j$ and $V_j$ also depend on the surface normal vector of the sample, which in general may be unknown and which may also vary spatially.

Additionally, a spectral band can be a single wavelength $\lambda_i$, for which $R_i(L_j, V_j) = R_{\lambda_i}(L_j, V_j)$, or a spectral band can also be a broadband that includes multiple wavelengths. In these broadband embodiments, the BRDF measurements may be assumed to use "white light" as light source and a camera with a broadband sensitivity $s_i(\lambda)$. If the power spectrum of the light source is flat or is approximately flat, then $R_i(L_j, V_j) = \int_0^\infty R_\lambda(L_j, V_j) s_i(\lambda) d\lambda$.

Moreover, some embodiments restrict measurements to measurements where the specular component dominates the diffuse component in order to make isolating the Fresnel reflectance $F_\lambda(u)$ easier. These restrictions can be implemented through the selection of the illumination and the camera. Some embodiments implement a homogeneous function $\chi(x_1, x_2, \ldots, x_N)$ of degree zero on the N measurements. Mathematically, a homogenous function of degree zero in N variables satisfies the following property: $\chi(\sigma x_1, \sigma x_2, \ldots, \sigma x_N) = \chi(x_1, x_2, \ldots, x_N)$ for any number $\sigma$.

Equation (3) and the assumption that the specular component dominates the diffuse component lead to $$\chi(R_1(L_j, V_j), \ldots, R_N(L_j, V_j)) \approx \chi(F_1(u_j), \ldots, F_N(u_j)), \quad (7)$$

where $F_i(u_j) = F_{\lambda_i}(u_j)$ in the case of a single-wavelength spectral band, and where $F_i(u_j) = \int_0^\infty F_\lambda(u_j) s_i(\lambda) d\lambda$ for a broadband spectral band. Equation (7) leads to a material-feature value (also referred to herein as a "feature value") for each illumination-observation pair $(L_j, V_j)$, and each illumination-observation pair $(L_j, V_j)$ gives a corresponding cosine of half angle $u_j$. The dependency of the Fresnel reflectance $F_\lambda(u)$ on the incident angle is very small, especially away from grazing angles (incident angles close to 90°). As a result, the material-feature values for multiple illumination-observation angles form clusters that are characteristic of respective metals, which enables the discrimination of different metals.

Examples of a homogeneous function of degree zero include the following: First, a ratio of two measurements in different spectral bands (spectral band i and spectral band i'): $R_i/R_{i'}$. This quantifies a rate of change of the Fresnel reflectance $F_\lambda(u)$ relative to wavelength $\lambda$. For example, if $R_i/R_{i'} > 1$, then the Fresnel reflectance $F_\lambda(u)$ increases from band i' to band i. In this case, the choice of the homogenous function of degree zero is $\chi(x_1, x_2, \ldots, x_N) = x_i/x_{i'}$.

The second example is a ratio of the measurement in spectral band i' to the geometric mean of the measurements in spectral bands i and i": $R_{i'}/\sqrt{R_i R_{i''}}$. This measures a concavity of the Fresnel reflectance $F_\lambda(u)$ relative to wavelength. For example, if $R_{i'}/\sqrt{R_i R_{i''}} > 1$, then the dependency on wavelength $\lambda$ is concave if the spectral bands i, i', i" are in ascending order of wavelength $\lambda$. In this example, the choice of the homogenous function of degree zero is $\chi(x_1, x_2, \ldots, x_N) = x_i / \sqrt{x_i x_{i''}}$.

Figure 4A:
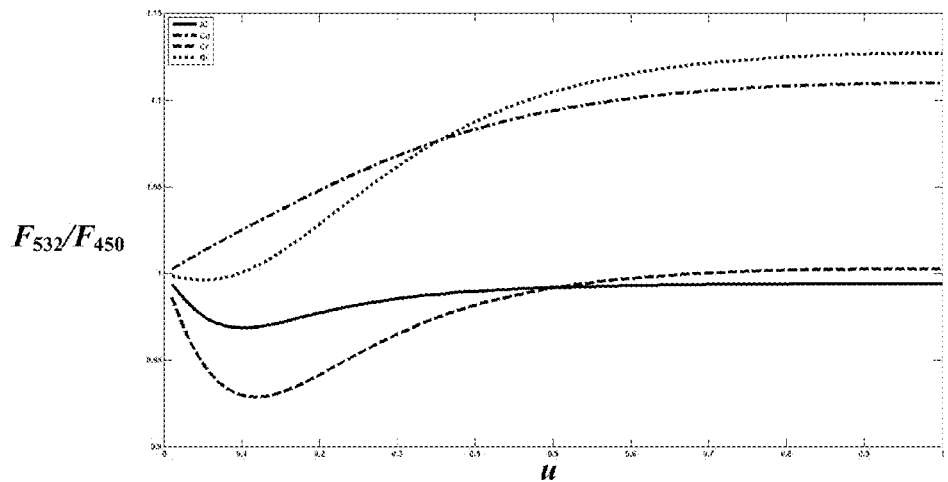
FIGS. 4A, 4B, and 4C illustrate plots of different features against the cosine of the incident angle u.
Figure 4B:
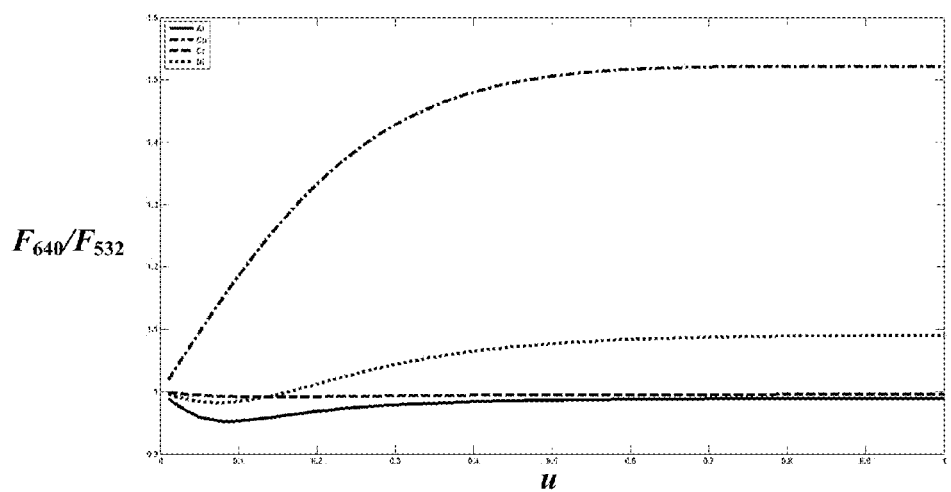
Figure 4C:
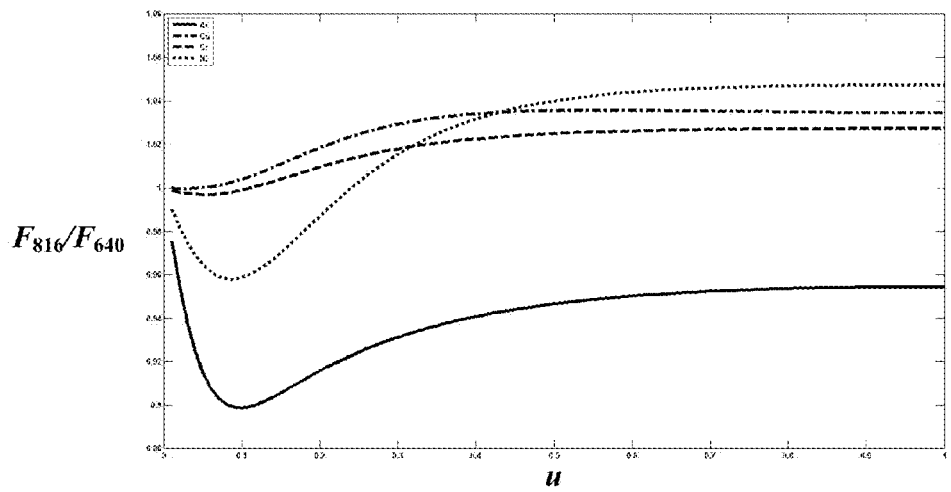

FIGS. 4A, 4B, and 4C illustrate plots of different material-feature values (e.g., ratios of the measurements in spectral bands) against the cosine of the incident angle u, which show the dependency of the ratio of the Fresnel reflectance $F_\lambda(u)$ at different wavelengths $\lambda$ on the cosine of the incident angle u. As noted above, for incident angles away from 90°, the curves illustrated by the plots are relatively flat. Also, using only visible wavelengths (FIGS. 4A and 4B), it may be difficult to discriminate aluminum from chromium. The use of the NIR wavelength 816 nm in FIG. 4C improves the discrimination of aluminum and chromium.

Figure 5A:
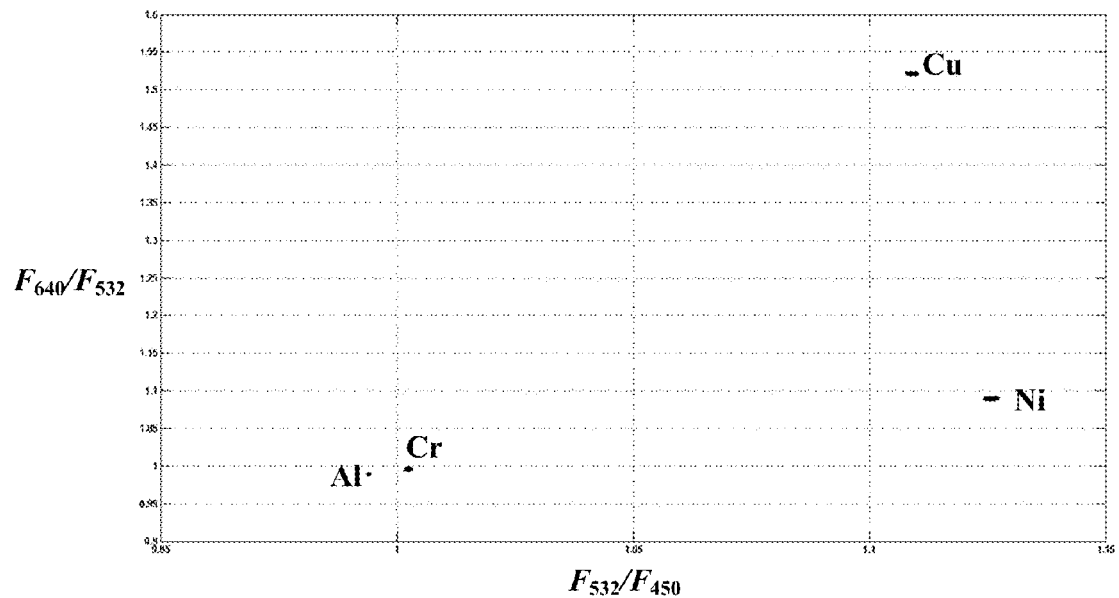
FIGS. 5A and 5B illustrate examples of two-dimensional material-feature spaces.
Figure 5B:
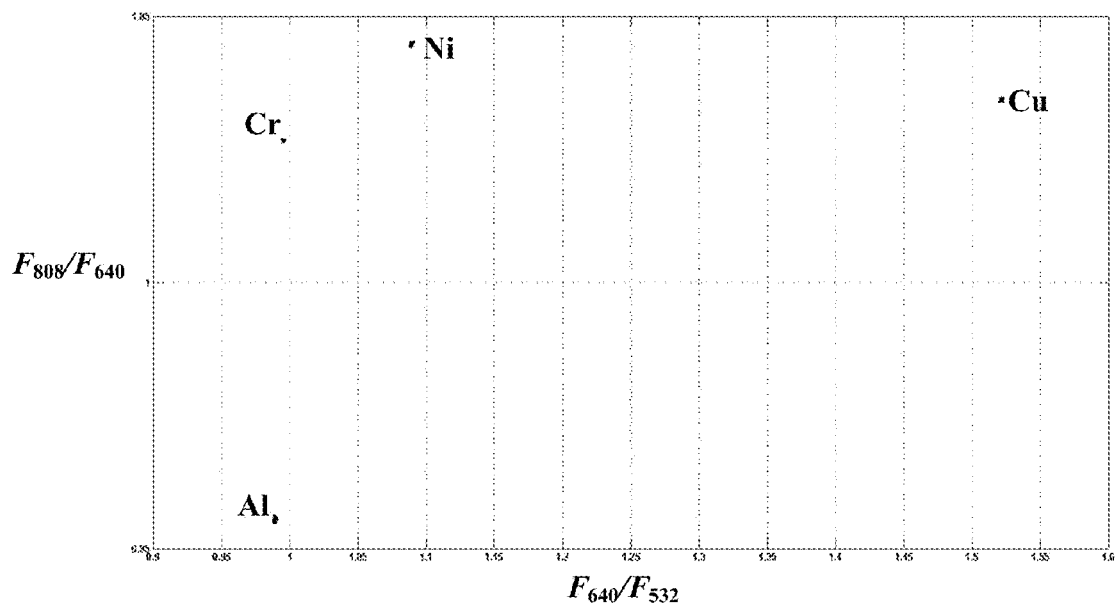
Figure 6:
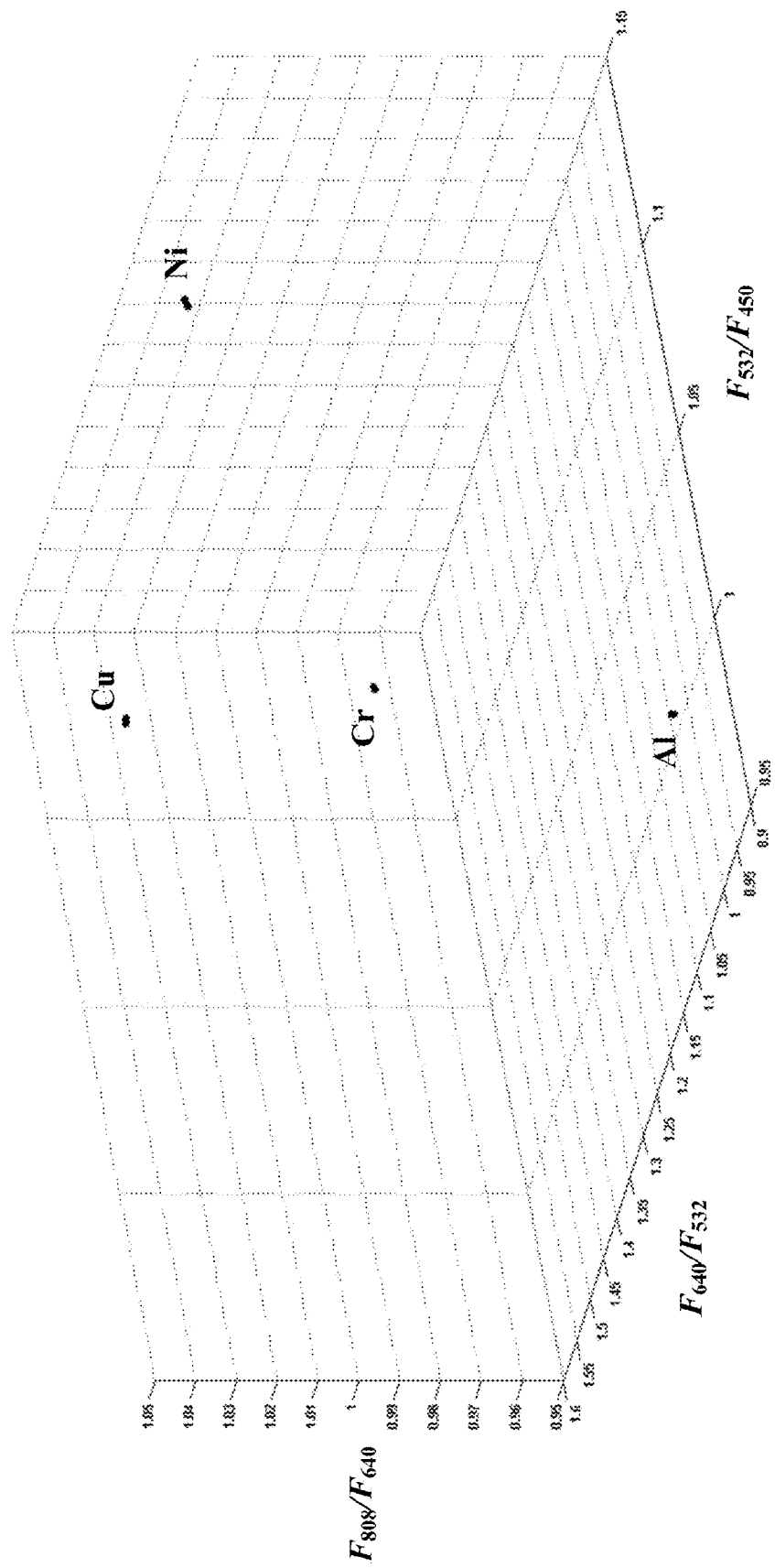
FIG. 6 illustrates an example of a three-dimensional material-feature space.

Accordingly, some embodiments of the system in FIG. 1 use a high-dimensional material-feature space to discriminate materials. These embodiments may combine multiple features into a higher-dimensional feature space and separate target materials using their respective feature-value vectors. FIGS. 5A and 5B illustrate examples of two-dimensional material-feature spaces, which are defined by different material features, and FIG. 6 illustrates an example of a three-dimensional material-feature space, although high-dimensional feature spaces may include more dimensions. The material-feature values may form per-material clusters in the feature spaces instead of per-material points because of the dependence of the Fresnel reflectance $F_\lambda(u)$ on the incident angle, and thus measurements generated with different incident angles may be different. Using the material features (e.g., the material-feature space that is defined by the two features) in FIG. 5A, it may be difficult to separate aluminum and chromium. However, based on the two material features (e.g., based on the two-dimensional material-feature space that is defined by the two material features) in FIG. 5B or based on the three material features (e.g., based on the three-dimensional material-feature space that is defined by the three material features) in FIG. 6, which both include a material feature generated using NIR BRDF, the difficulty is resolved.

Figure 7:
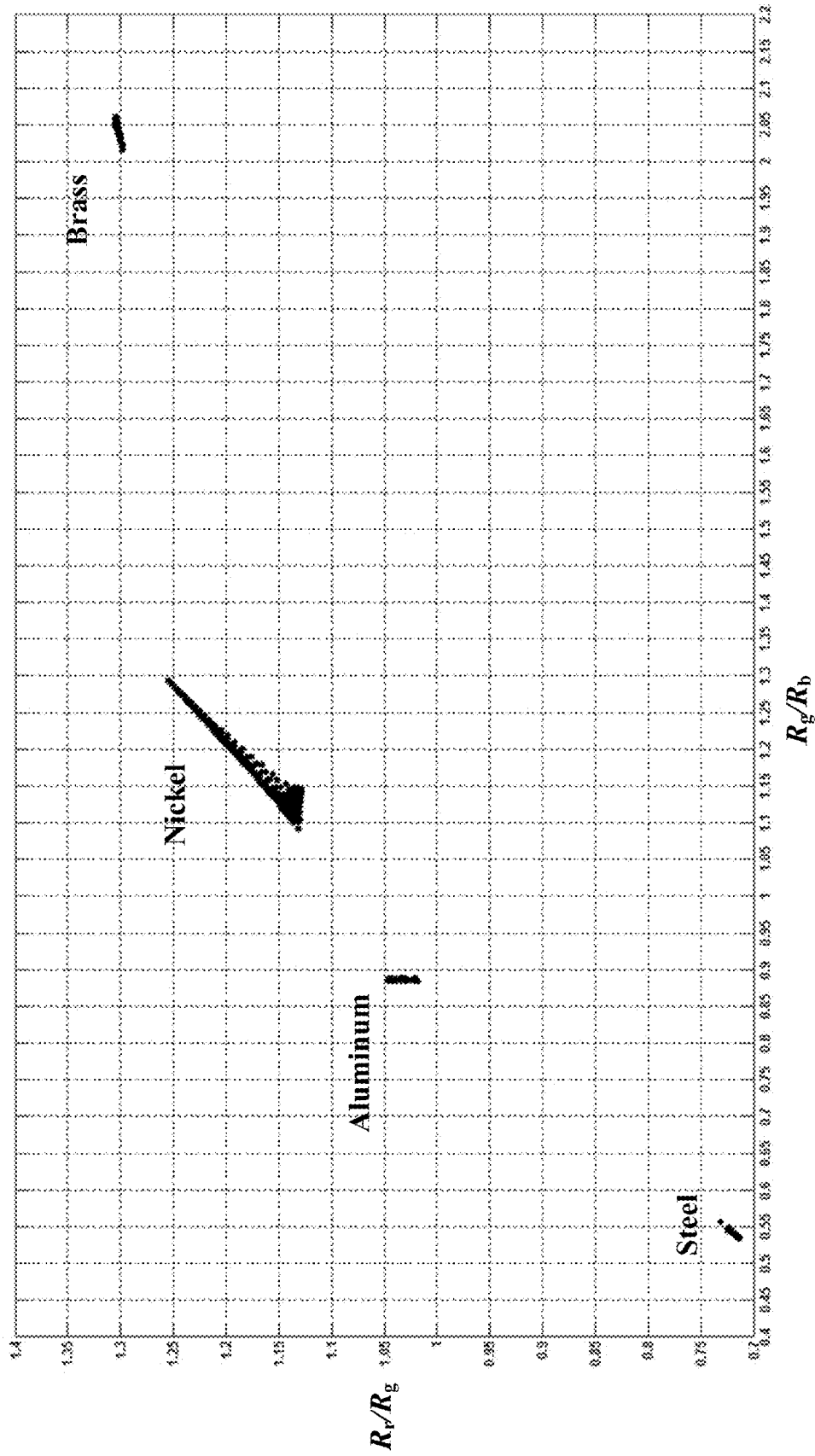
FIG. 7 illustrates an example of a two-dimensional material-feature space.

Also, FIG. 7 illustrates an example of a two-dimensional material-feature space. The two-dimensional material-feature space shows a plot of material-feature values that were generated from broadband BRDF measurements generated by an RGB camera.

In the system in FIG. 1, the camera 110 may be a multispectral camera and the projector 120 may be a multi-channel projector, for example as described in U.S. patent application Ser. No. 13/839,292 and U.S. patent application Ser. No. 13/839,457, which are incorporated by reference. Embodiments of the system that include a multispectral camera and a multi-channel projector may perform BRDF sampling that increases the likelihood of inducing a reflection that has a specular component that dominates the diffuse component. These embodiments may use the ratio of measurements in at least two spectral bands as a material-feature value and may use spectral structured light to generate the measurements.

For example, the camera 110 may be a multispectral camera that detects light in at least N channels, and the projector 120 may be a multi-channel projector that emits light in N channels, where N is at least two, and thus these embodiments are capable of measuring a reflection in at least two spectral bands. The number N may further be higher than two to provide sufficient accuracy for estimating a three-dimensional (3D) position map. For example, N=10 may provide a total of $2^{10} = 1024$ depth levels.

A multispectral camera can be implemented using, for example, a color filter array (CFA) that generalizes the standard Bayer CFA to more than three colors. A multispectral camera can also be implemented using a color-filter wheel along with a monochrome sensor. Additionally, a color filter can be pigment based, and the polarization state of light passing through such a filter will be unaltered, so that the polarization state of light before and after passing through such a filter remains unknown. Therefore, some embodiments may not capture a polarization property of light.

An exposure setting for the camera 110 may be set so the camera 110 captures mainly the specular reflection. For example, using a relatively short exposure setting, the pixels that detect mostly the specular reflection can capture the specular reflection without overexposure. The pixels that detect mostly a diffuse reflection may be underexposed and may be cropped out or ignored, for example during an image processing procedure during the calculation of material-feature values. Also, some embodiments use a high-dynamic-range (HDR) sensor to capture all pixels, regardless of whether the reflection detected by a particular pixel is mainly specular or diffuse.

Figure 8:
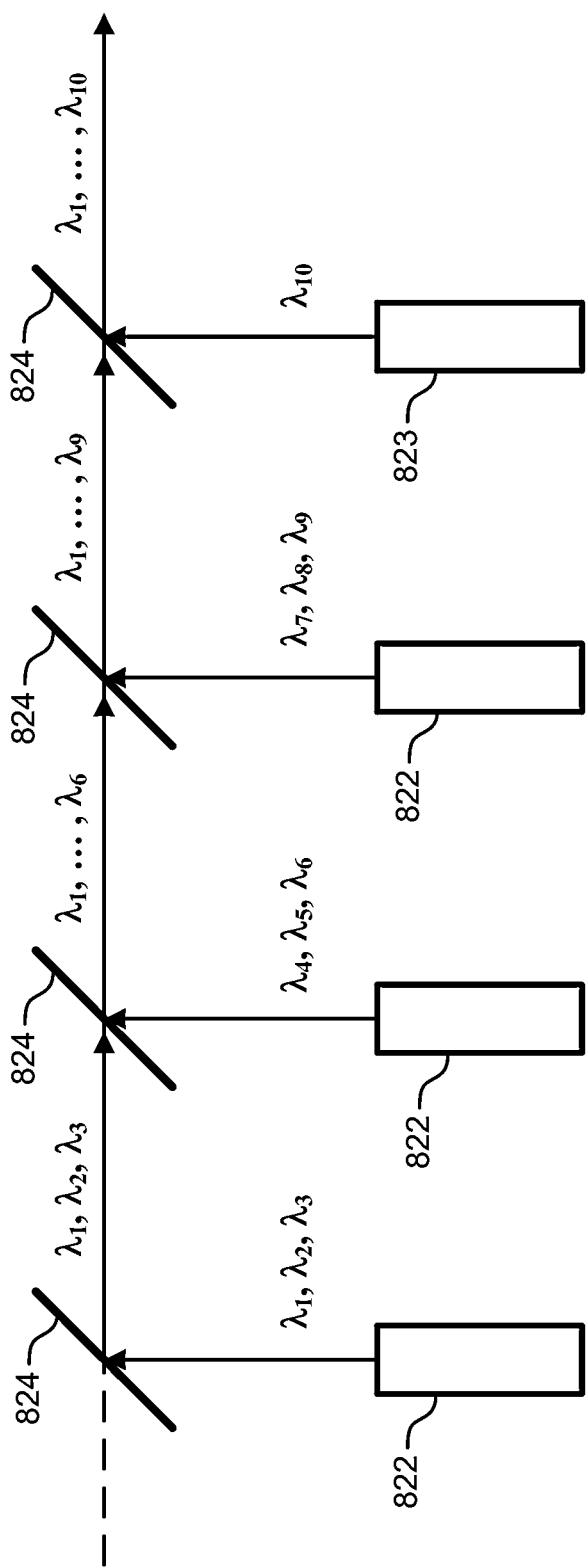
FIG. 8 illustrates an example embodiment of a multi-channel projector.

Additionally, the multi-channel projector may be configured to have a monochrome wavelength in each channel, for example in N distinct wavelengths: $\lambda_1, \lambda_2, \ldots, \lambda_N$. Some embodiments of a multi-channel projector use multiple relatively-few-channel (e.g., three- or four-channel) projectors in a co-axial configuration, for example as shown in FIG. 8, which illustrates an example embodiment of a 10-channel projector. The embodiment of the multi-channel projector includes four semi-transparent mirrors 824, a single-channel projector 823, and three three-channel projectors 822, each of which projects light in three wavelengths. For example, a first three-channel projector 822 projects light in the following three wavelengths: $\lambda_1, \lambda_2$, and $\lambda_3$. The number of projectors with relatively few channels and the distribution of wavelengths over these projectors may be different in other embodiments.

Furthermore, the channels of a multi-channel projector may be generated by one or more laser light sources, which give the multi-channel projector a very large depth of field and the ability to focus at close distances. For example, four wavelengths of a multi-channel projector may be chosen to be commercially available laser wavelengths: 450 nm, 532 nm, 640 nm, and 808 nm. Also, the $4^{th}$ channel's wavelength, which is in the NIR range of the spectrum, may be particularly useful for identifying aluminum. Additionally, the laser light sources may not, in general, produce polarized light.

Figure 9B:
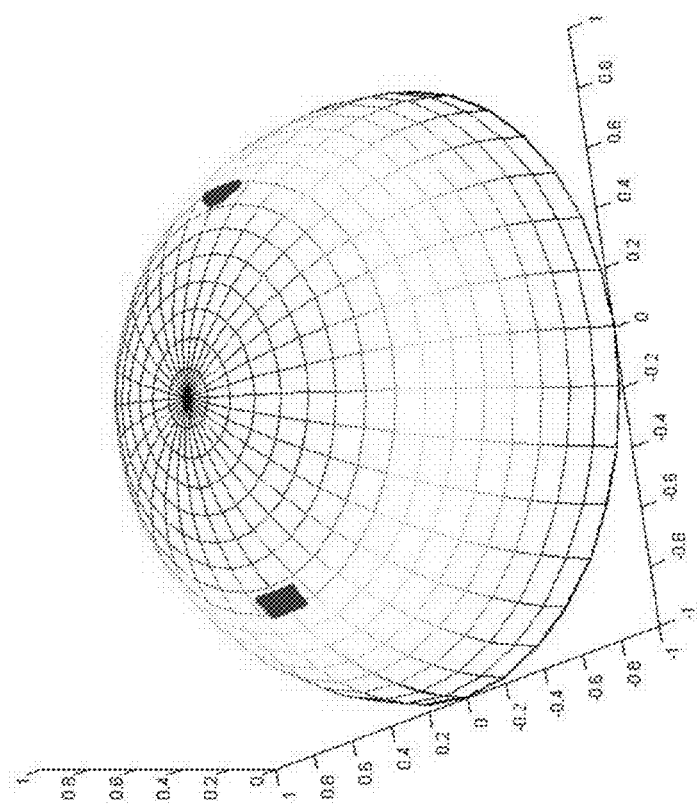
FIG. 9B illustrates an example of the sampling angular range for observation.
Figure 9A:
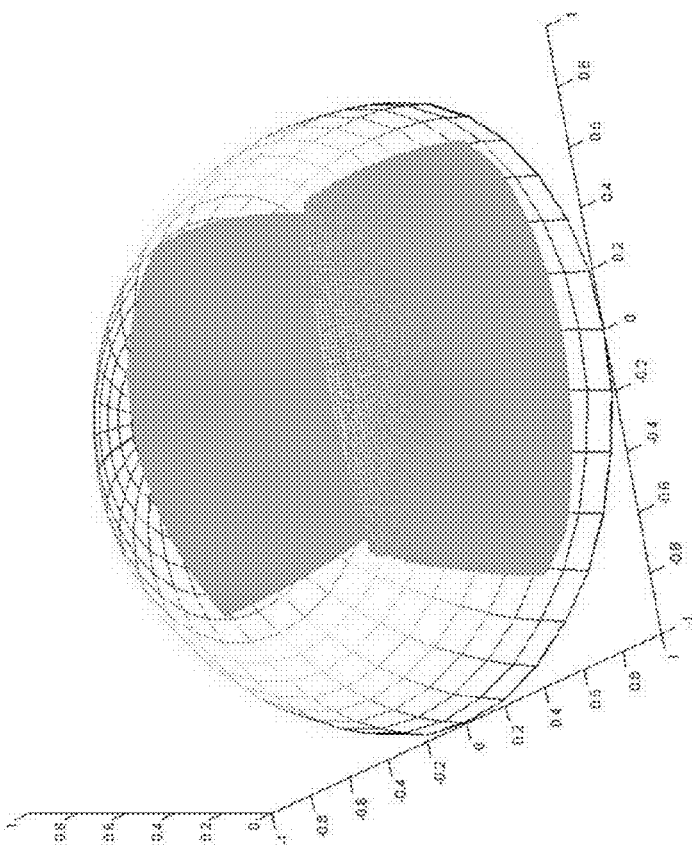
FIG. 9A illustrates an example of the sampling angular range for illumination.

In some embodiments, for example the embodiment illustrated by FIG. 1, the multi-channel projector (an example of a projector 120) is placed relatively close to the material sample 100 and is focused on the material sample 100, while the multispectral camera (an example of a camera 110) is placed relatively far from the material sample 100 and is focused on the material sample 100. Even though the exact directions of the surface normal vectors of the material sample 100 are not known a priori, the arrangement of a long-focus for the camera 110 and short-focus for the projector 120 may increase the likelihood of capturing a specular reflection. By focusing the camera 110 at a longer distance, the viewing angles associated with the camera pixels are within a relatively narrow range. Although the orientations of the surface normal vectors of the material sample 100 are unknown, there is a relatively narrow range of illumination angles for which specular reflection can occur. When using a projector 120 that is focused at a short distance, the sampling angular range for the illumination of the material sample 100 is relatively large. This may increase the chance that the sampling angular range will include the relatively narrow range that is necessary to capture a specular reflection. FIG. 9A illustrates an example of the sampling angular range for illumination, and FIG. 9B illustrates an example of the sampling angular range for observation (e.g., capture). Also, due to the Helmholtz reciprocity of BRDF, the illumination direction and the observation direction are interchangeable. Therefore, some embodiments use a long focus for the projector 120 and a short focus for the camera 110.

Additionally, some embodiments of the system of FIG. 1 use a spectral-structured light system that uses N-bit binary Gray code (e.g., N=10) as the coded pattern for projection. These embodiments can obtain shape and surface normal vectors. In some embodiments, a pattern corresponding to the N-bit binary Gray code pattern and its complementary pattern (which interchanges 0's and 1's in the binary Gray code pattern) are projected in a temporal sequence, thus requiring two image captures to determine the position and surface normal vector of a scene point. The intensity value of a pixel in the two captured images is related to the radiance of reflected light, regardless of its polarization state. Accordingly, some embodiments of the spectral-structured light system do not include a polarizer to distinguish different polarization states of light, and thus the captured images represent a total radiance of reflected light in all polarization states.

In some embodiments, the wavelengths in the channels of the projector 120 are arranged in a way that depends on how high the spatial frequencies that the camera 110 can reasonably resolve are. In the following paragraphs, the lowest channel number corresponds to the highest spatial frequency, the second-lowest channel number corresponds to the next highest spatial frequency, and so on. In some embodiments, the four wavelengths 450 nm, 532 nm, 640 nm, and 808 nm do not correspond to the lowest numbered channels in the system. Instead, the channels correspond to the highest spatial frequencies that the camera 110 can reasonably resolve, and thus the choice of the four channels depends on the resolution of the camera 110. For example, Table 1 shows an example where the camera can reasonably resolve the spatial frequencies of channel 3 and the higher-numbered channels (this description assumes that the spatial frequencies of the projected patterns decrease as the projector channel number increases):

TABLE 1

| | Projector channel no. | | | | | | | | | |
|---|---|---|---|---|---|---|---|---|---|---|
| | 1 | 2 | 3 | 4 | 5 | 6 | 7 | 8 | 9 | 10 |
| Wavelength (nm) | 375 | 405 | 450 | 532 | 640 | 808 | 473 | 670 | 685 | 705 |

In other embodiments, spatial frequencies of the projected patterns may not decrease as the projector channel number increases. For example, in some embodiments, spatial frequencies of the projected patterns increase as the projector channel number increases. More generally, the relationship between the spatial frequencies of the projected patterns and the projector channel numbers may be different than the one assumed in Table 1 by a permutation of the N channels. The arrangement of wavelengths in Table 1 may then be adjusted by the same permutation.

Figure 11:
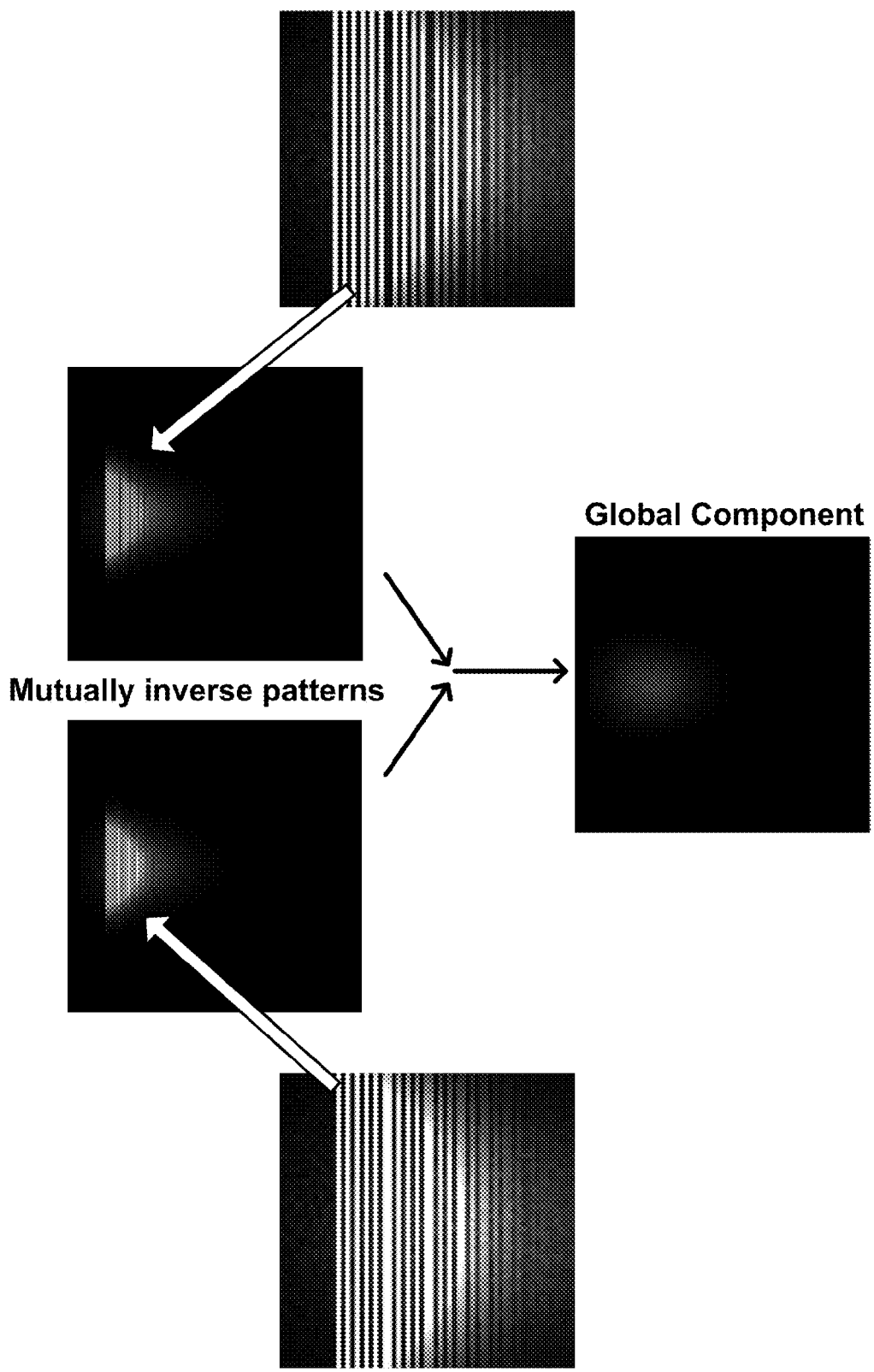
FIG. 11 illustrates an example embodiment in which the resolution of a camera is high enough to resolve the highest spatial frequency of a projected pattern.
Figure 12:
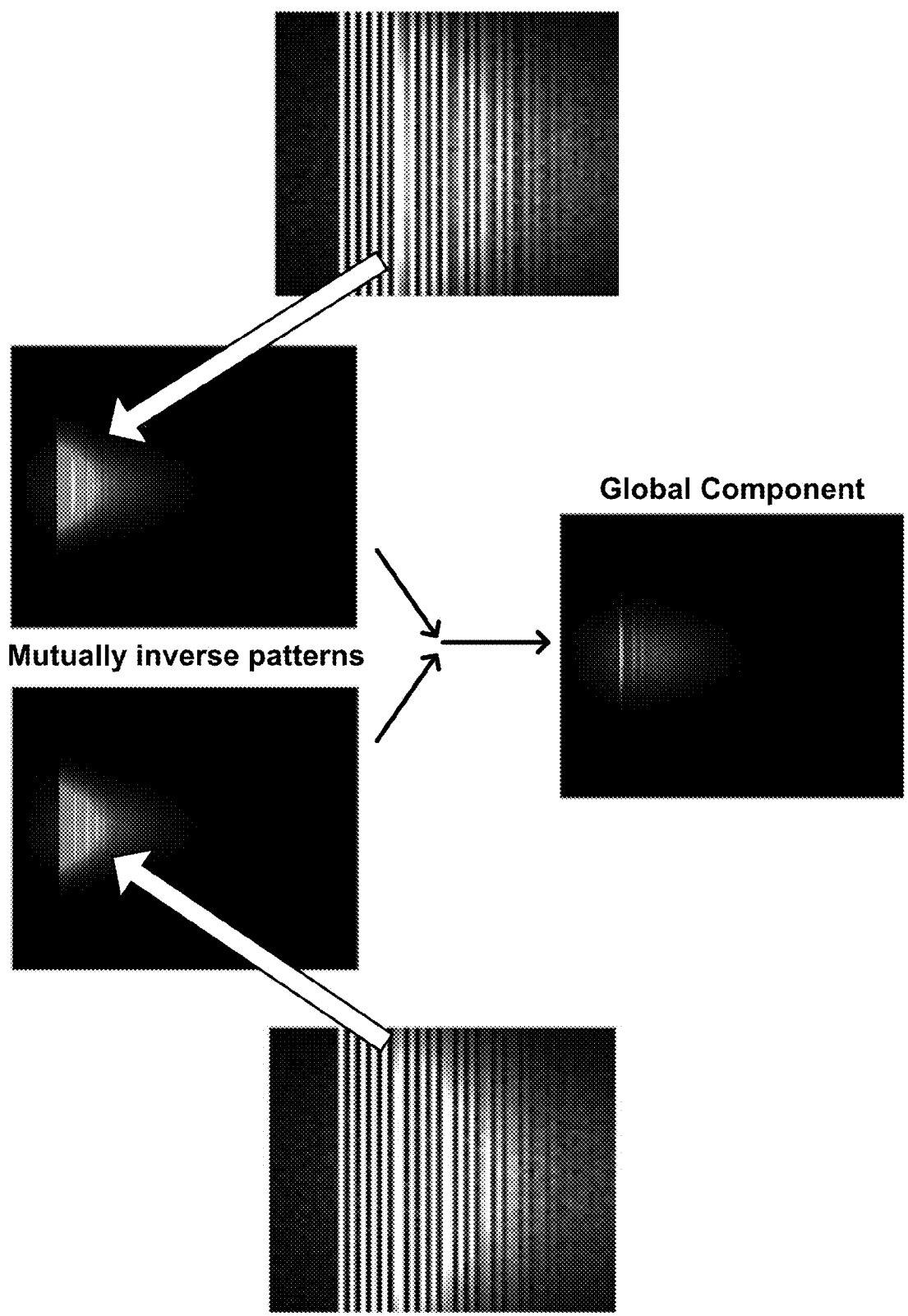
FIG. 12 illustrates an example embodiment in which the resolution of a camera is not high enough to resolve the highest spatial frequency of a projected pattern.

FIG. 11 illustrates an example embodiment in which the resolution of a camera 110 is high enough to resolve the highest spatial frequency of a projector 120, which corresponds to the lowest projector channel number. In this example embodiment, a first binary pattern and a second binary pattern are projected in each projector channel, and the two binary patterns are mutually complementary, or inverse to each other, as for example described in U.S. patent application Ser. No. 13/839,292. As can be seen in FIG. 11, the mutually complementary patterns are well resolved, and the global component of the illumination can be recovered correctly. The global component of the illumination corresponds to indirect reflections, such as interreflections, from light originating from the projector and generally does not contain information about the code in the coded patterns. FIG. 12 illustrates an embodiment where the resolution of the camera is not high enough to resolve the highest spatial frequency in the lowest-numbered projector channel. "Bleeding" can be seen in both of the mutually inverse patterns, and the global component recovered from these patterns has errors.

In some embodiments, the spatial frequency for a spectral band of the coded pattern depends on the channel, and the spatial frequency for one spectral band of the coded pattern is different than the spatial frequency for another spectral band of the coded pattern. For example, in some embodiments, for important spectral bands (e.g., wavelengths), the spatial frequencies for the spectral bands (e.g., wavelengths) are not the higher spatial frequencies. Instead the spatial frequencies for the spectral bands are lower in accordance with the ability of the camera 110 to resolve the coded patterns.

Figure 10A:
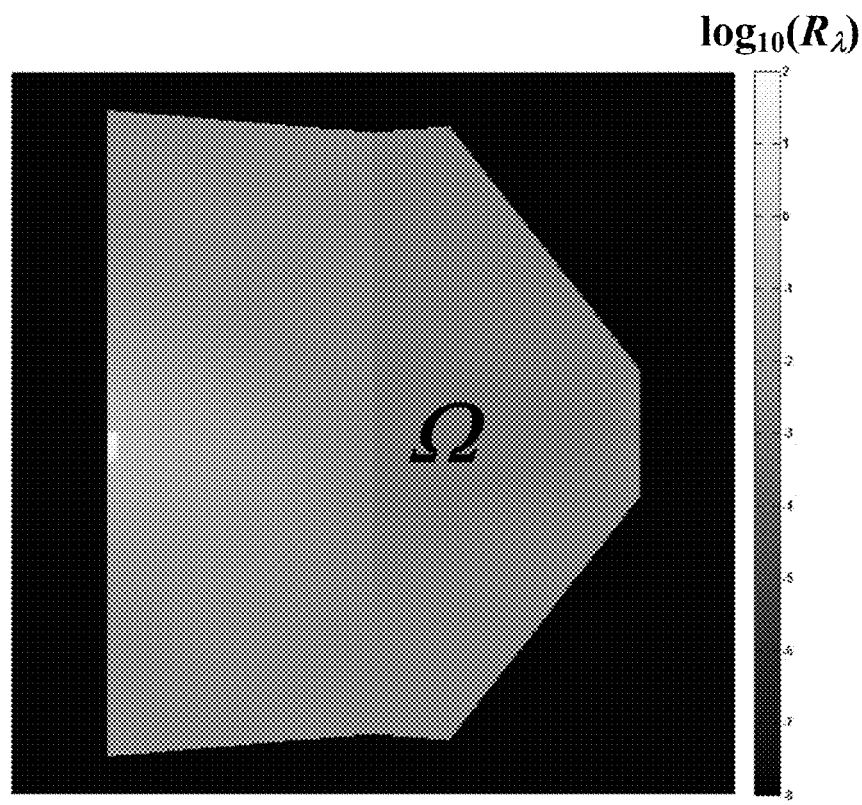
FIG. 10A illustrates an example embodiment of a reflectance map.

In addition, the two captured images (e.g., measured reflections 105) that correspond to two mutually complementary binary Gray code patterns can, after the removal of interreflections, be combined by the system to form one or more radiance maps $I_{\lambda_i}(p)$ (e.g., a radiance map for each wavelength $\lambda_i$) of a contiguous region $\Omega$ of pixels that correspond to a region on the sample surface, where $p \in \Omega$ is a pixel. Through radiometric calibration of the projector 120 (e.g., during an initial setup of the system), the irradiance at pixel p at normal incidence can be predetermined. Correcting for foreshortening using the information about the surface-normal vector at pixel p, the system can generate an incident irradiance map $E_{\lambda_i}(p)$. An estimate of the BRDF at pixel p can be obtained by generating a reflectance map $R_\lambda(p)$, for example according to $R_{\lambda_i}(p) = I_{\lambda_i}(p)/E_{\lambda_i}(p)$. In addition, each pixel p is associated with an illumination-observation angle pair $(L_j, V_j)$ using the information about the intrinsic and extrinsic parameters of the camera 110 and the projector 120, which may be obtained by geometric calibration (e.g., during an initial setup of the system). FIG. 10A illustrates an example embodiment of a reflectance map $R_\lambda(p)$.

Figure 10B:
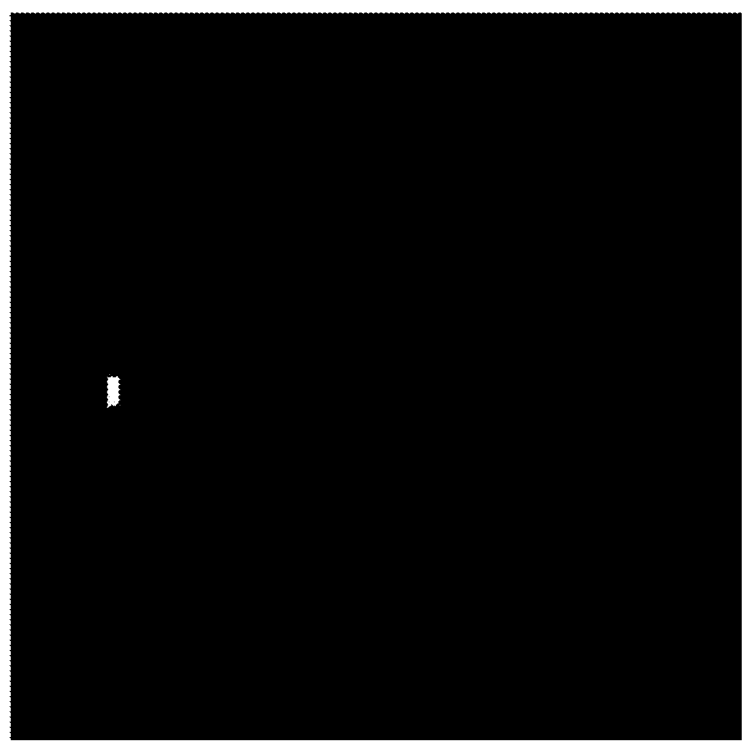
FIG. 10B illustrates an example embodiment of a mask that corresponds to a threshold.

Some embodiments use only a sub-region of the contiguous region $\Omega$ of the reflectance map $R_\lambda(p)$ that corresponds to the specular reflection, and thus attempt to ignore the diffuse component. A threshold reflectance (and the corresponding mask) may be determined by examining the dynamic range of the reflectance map $R_\lambda(p)$. Then a region that corresponds to the specular reflection is determined by considering only the pixels p that have reflectance values above the determined threshold. FIG. 10B illustrates an example embodiment of a mask that corresponds to a threshold.

The material-identification module 130 may generate a material-feature value for each pixel p in the region that corresponds to the specular reflection. The feature values of the pixels p may, in general, form a cluster (see, e.g., FIG. 7). The system may determine the center of the cluster, after optionally removing any outliers. The system then generates a material-feature value for the cluster, or if multiple features are used, generates respective material-feature vectors for the clusters. The material-identification module 130 can compare these one or more material-feature values or material-feature vectors with the material-feature values or material-feature vectors (which are examples of material-reflectance information 143) of known materials in a material database 140 to generate the material classification 133 for the material sample 100.

Figure 13:
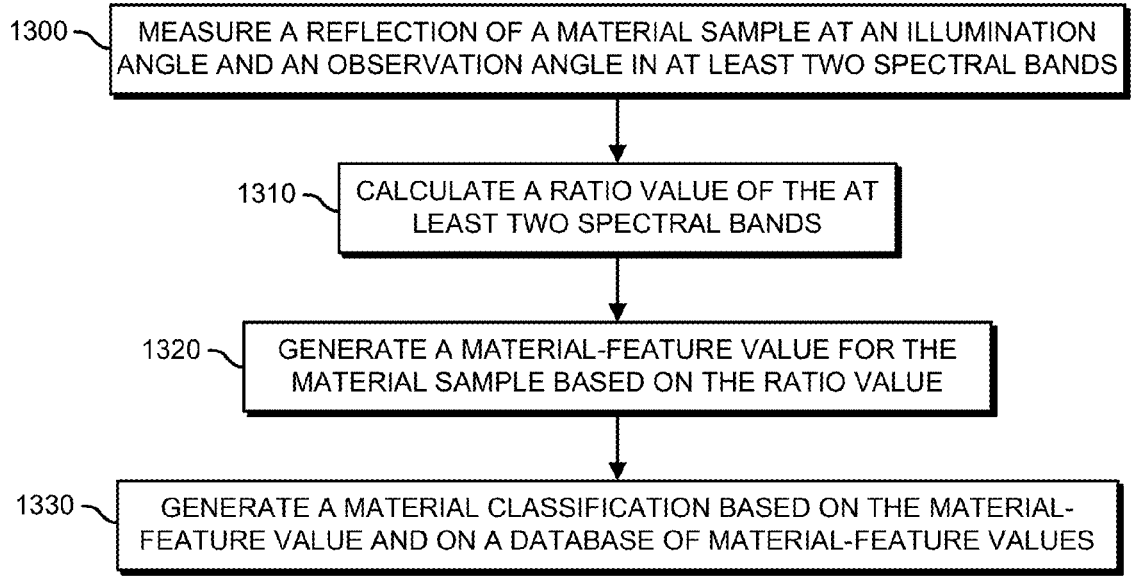
FIG. 13 illustrates an example embodiment of an operational flow for classifying materials.

FIG. 13 illustrates an example embodiment of an operational flow for classifying materials. The blocks of this operational flow and the other operational flows described herein may be performed by one or more computing devices, for example the systems and devices described herein. Also, although this operational flow and the other operational flows described herein are each presented in a certain order, some embodiments may perform at least some of the operations in different orders than the presented orders. Examples of possible different orderings include concurrent, overlapping, reordered, simultaneous, incremental, and interleaved orderings. Thus, other embodiments of this operational flow and the other operational flows described herein may omit blocks, add blocks, change the order of the blocks, combine blocks, or divide blocks into more blocks.

The flow starts in block 1300, where a reflection (e.g., a specular reflection) of a material sample is measured at an illumination angle and an observation angle in at least two spectral bands, for example by capturing one or more images of the material sample. In some embodiments, measuring the reflection includes generating a measurement of a BRDF function or of a reflected radiance. Next, in block 1310, a ratio value of the at least two spectral bands is calculated. The flow then moves to block 1320, where a material-feature value is generated for the material sample, based on the ratio value. In some embodiments, the material-feature value is also based on a Fresnel reflectance of the sample. The flow then proceeds to block 1330, where a material classification is generated based on the material-feature value and on a database of material-feature values.

Figure 14:
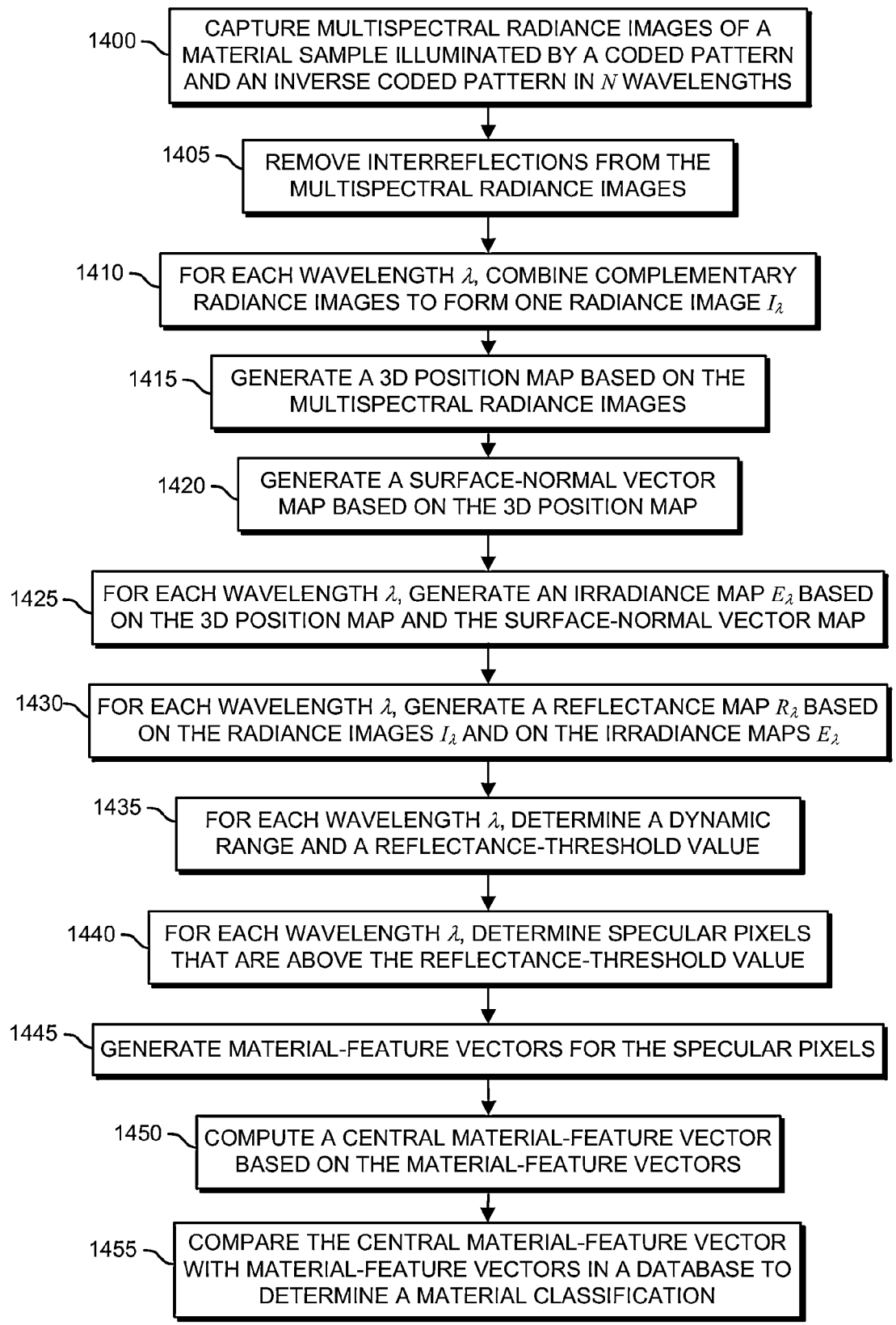
FIG. 14 illustrates an example embodiment of an operational flow for classifying materials.

FIG. 14 illustrates an example embodiment of an operational flow for classifying materials. The flow starts in block 1400, where multispectral radiance images of a material sample that is illuminated by a coded pattern and an inverse coded pattern in N wavelengths are captured. The flow then moves to block 1405 where interreflections are removed from the multispectral radiance images, for example based on the coded pattern and the inverse coded pattern. For example, for wavelength $\lambda$, if the multispectral radiance images for the coded pattern and the inverse coded pattern are respectively $I_\lambda^{(0)}$ and $I_\lambda^{(1)}$, then the interreflection-removed multispectral radiance images may be respectively generated according to $\tilde{I}_\lambda^{(0)} = I_\lambda^{(0)} - \min(I_\lambda^{(0)}, I_\lambda^{(1)})$ and $\tilde{I}_\lambda^{(1)} = I_\lambda^{(1)} - \min(I_\lambda^{(0)}, I_\lambda^{(1)})_\lambda)$. Next, in block 1410, for each wavelength $\lambda$, the respective complementary multispectral radiance images (of the coded pattern and the inverse coded pattern) are combined to form one radiance image $I_\lambda$ for the wavelength $\lambda$. For example, in some embodiments the radiance image $I_\lambda$ is generated according to $I_\lambda = \tilde{I}_\lambda^{(0)} + \tilde{I}_\lambda^{(1)}$). The flow then proceeds to block 1415, where a three-dimensional (3D) position map is generated based on the multispectral radiance images, for example multispectral radiance images $\tilde{I}_\lambda^{(0)}$ and $\tilde{I}_\lambda^{(1)}$.

Next, in block 1420, a surface-normal vector map is generated based on the three-dimensional position map. The flow then moves to block 1425, where for each wavelength $\lambda$, an irradiance map $E_\lambda$ is generated based on the three-dimensional position map and the surface-normal vector map. The flow then proceeds to block 1430 where, for each wavelength $\lambda$, a reflectance $R_\lambda$ map is generated based on the radiance images $I_\lambda$ and on the irradiance maps $E_\lambda$, for example according to $R_\lambda = I_\lambda / E_\lambda$.

Next, in block 1435, for each wavelength $\lambda$, a dynamic range and a reflectance-threshold value are determined. The flow then moves to block 1440 where, for each wavelength $\lambda$, specular pixels that are above the reflectance-threshold value are determined. Following, in block 1445, material-feature vectors are generated for the specular pixels. For example, in some embodiments a material-feature vector is generated for each specular pixel. The flow then moves to block 1450, where a central material-feature vector is determined based on the material-feature vectors. A central material-feature vector may be an average of the material-feature vectors for the specular pixels. A different statistic for central tendency may be used, such as a component-wise median of the material-feature vectors for the specular pixels. Finally, in block 1455, the central material-feature vector is compared with the material-feature vectors in a database of material-feature vectors to determine a material classification.

Figure 15:
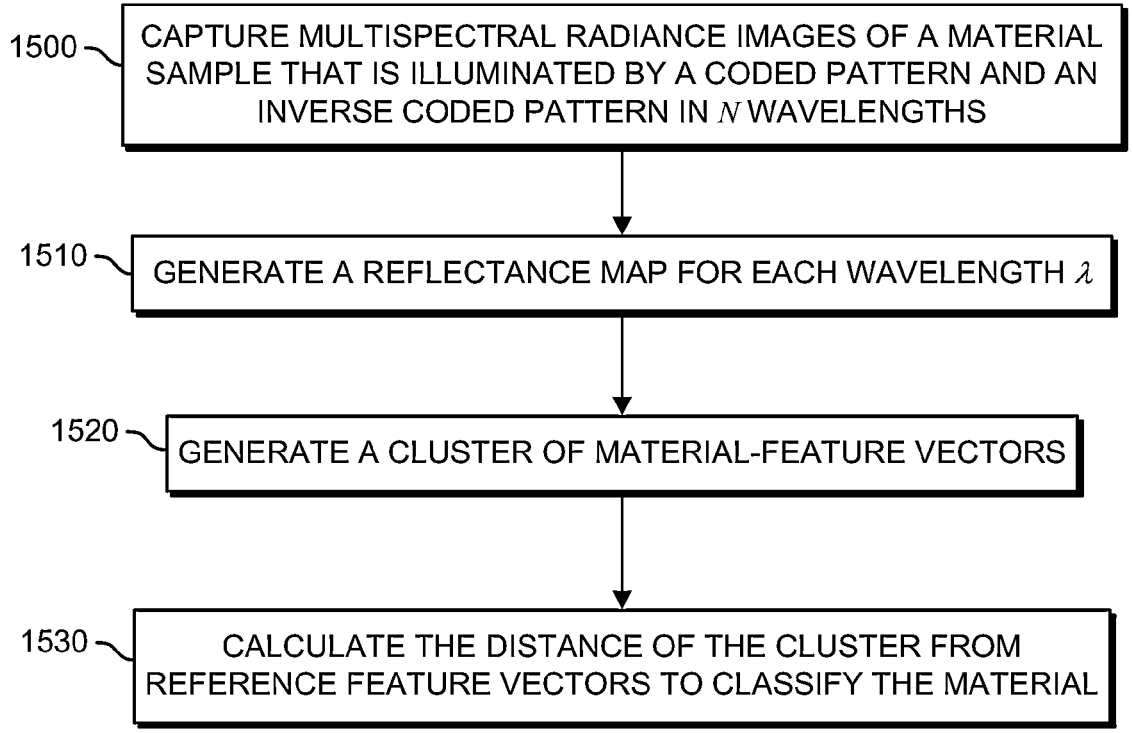
FIG. 15 illustrates an example embodiment of an operational flow for classifying materials.

FIG. 15 illustrates an example embodiment of an operational flow for classifying materials. In block 1500, multispectral radiance images of a material sample that is illuminated by a coded pattern and an inverse coded pattern in N wavelengths $\lambda$ are captured. In some embodiments, two stacks of mutually complementary images are captured, and each stack includes N images that correspond to the N wavelengths. Next, in block 1510, a reflectance map is generated for each wavelength $\lambda$, for example as described in FIG. 16. The flow then moves to block 1520, where a cluster of material-feature vectors is generated based on one or more of the reflectance maps. Finally, in block 1530, respective distances of the cluster (e.g., a centroid of the cluster) of material-feature vectors from reference material-feature vectors are calculated, and the material is classified based on the distance (e.g., the material sample is classified as the material that corresponds to the shortest distance).

Figure 16:
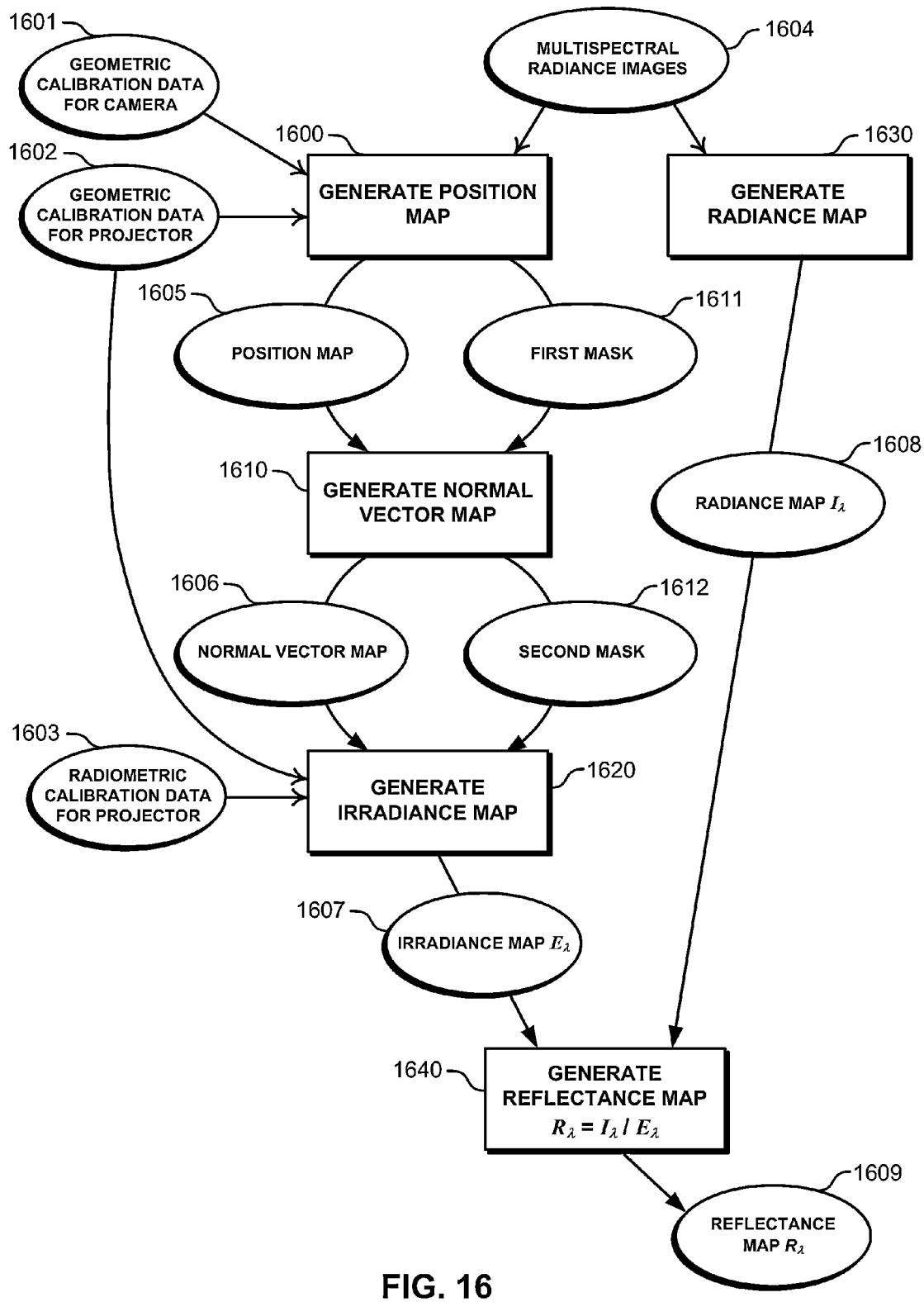
FIG. 16 illustrates an example embodiment of an operational flow for generating a reflectance map.

FIG. 16 illustrates an example embodiment of an operational flow for generating a reflectance map, for example in block 1510. In block 1600, a position map 1605 is generated based on geometric calibration data for a camera 1601, on geometric calibration data for a projector 1602, and on multispectral radiance images 1604 (which may be the output of block 1500 in FIG. 15). For example a position map 1605 of surface points may be computed from the multispectral radiance images 1604 using information about the locations of the projector and the camera (e.g., from a geometric calibration performed before the system is used) and a method of triangulation, though in some embodiments, the position map 1605 is generated or obtained through different techniques. For example, the position map 1605 may be obtained from another system, such as another structured light system or a photometric stereo system. The position map 1605 may also be available from prior knowledge of the shape of the material sample, for example a material sample that is known to be flat.

Additionally, outside the specular highlight region, the multispectral radiance images 1604 are sometimes very dark, and these areas outside the specular highlight region may be ignored when determining the positions of surface points. To identify pixels in the multispectral radiance images 1604 that are too dark, some embodiments use a threshold $\tau_0$, for example $\tau_0$=0.3, and generate a first mask 1611. For example, if the two mutually complementary stacks of multispectral radiance images 1604 are respectively denoted by $\{I_{\lambda_i}^{(0)}\}_{i=1, 2, \ldots, N}$ and $\{I_{\lambda_i}^{(1)}\}_{i=1, 2, \ldots, N}$, then the dark pixels are "masked out" using a binary mask $M_1$ 1611 (an example of the first mask 1611) according to $$M_1(p) = \begin{cases} 1 & \text{if } \forall i = 1, 2, \ldots, N, I_{\lambda_i}^{(0)}(p) > \tau_0 \cdot \mu_i \text{ or} \\ & \quad I_{\lambda_i}^{(1)}(p) > \tau_0 \cdot \mu_i \\ 0 & \text{otherwise} \end{cases},$$

where $\mu_i = \max_q (\max(I_{\lambda_i}^{(0)})(q), I_{\lambda_i}^{(1)}(q)))$, and where p is a pixel.

Figure 17:
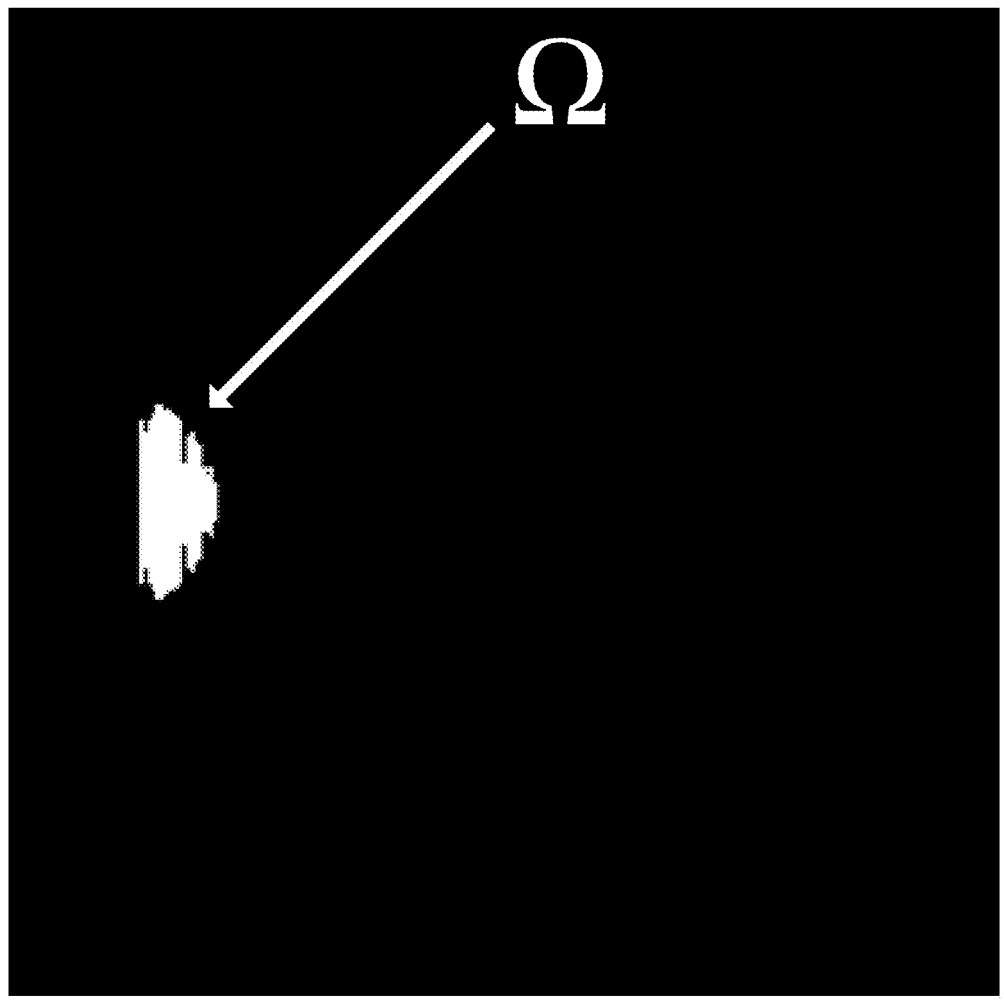
FIG. 17 illustrates an example embodiment of a second mask.

Next, in block 1610, a normal vector map 1606 is generated based on the position map 1605. For example, a surface normal vector map 1606 may be computed from the position map 1605 by fitting local tangent planes. These operations may further increase the number of ignored pixels in the multispectral radiance images 1604 because pixels near the boundary of the region defined by the first mask 1611 would not have enough neighboring pixels for the fitting. Accordingly, these operations may further modify the first mask 1611 to generate a second mask 1612 that is smaller than the first mask 1611 (e.g., has fewer 1's than the first mask). FIG. 17 illustrates an example embodiment of a second mask 1612.

Figure 18:
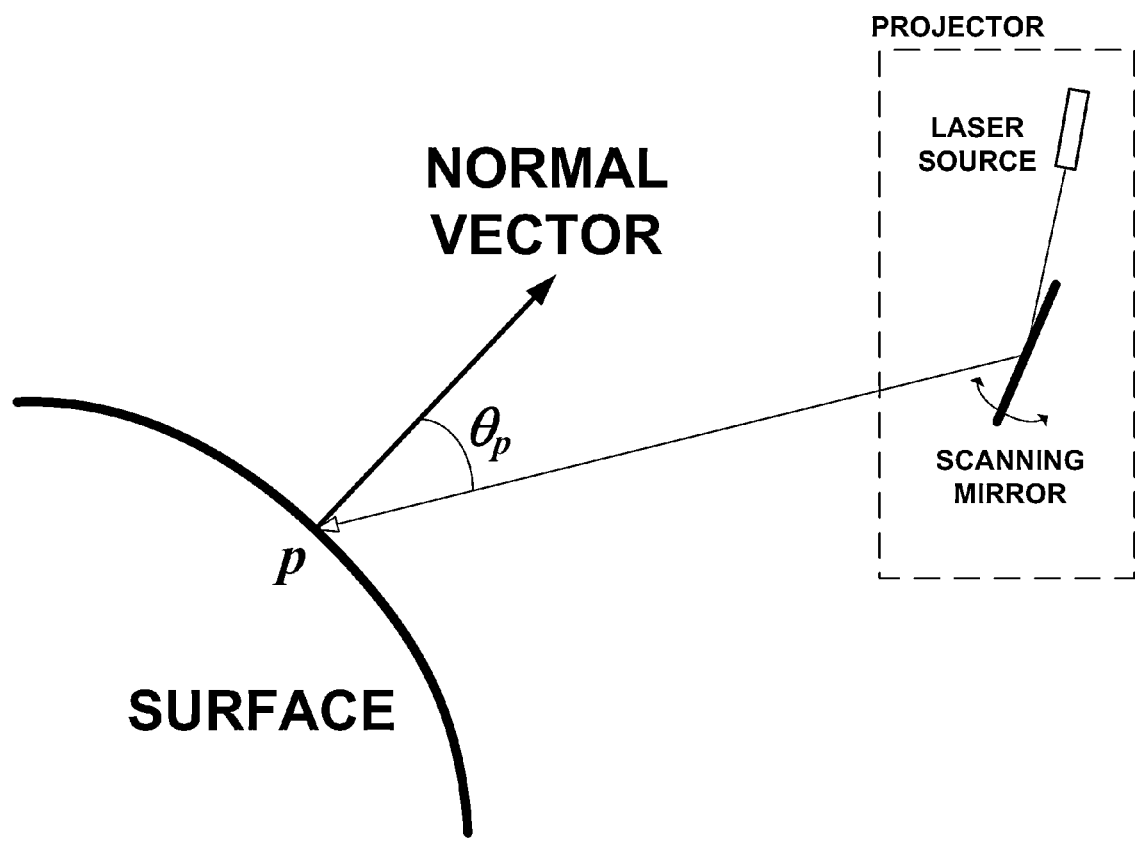
FIG. 18 illustrates an example of an incident angle.

The flow then moves to block 1620, where an irradiance map $E_{\lambda_i}$ 1607, for (i=1, 2, ... N), is generated based on the normal vector map 1606 and on radiometric calibration data 1603 (e.g., a projector irradiance map $E_{\lambda_i}^{(0)}$) for the projector (the radiometric calibration may be performed before the operations in FIG. 16 are performed). For example, for a laser projector, radiometric calibration may produce a projector irradiance map $E_{80_i}^{(0)}$(i=1, 2, . . . , N) at normal incidence. Accordingly, at scene points (e.g., points on a surface of a material sample) not too far away from the laser projector, the laser beam exhibits almost no divergence and therefore has constant irradiance at normal incidence (i.e., zero-degree incidence) along a given angle. However, irradiance at a scene point still depends on the incident angle, which is the angle between the surface normal vector and the direction of the projector beam. FIG. 18 illustrates an example of an incident angle $\theta_p$. The irradiance map $E_{\lambda_i}$ 1607 may be generated according to $E_{\lambda_i}(p) = E_{\lambda_i}^{(0)}(p) \cos \theta_p$, i=1, 2, . . . , N, where p is a pixel.

Additionally, in block 1630, which may be performed independently of one or more of blocks 1600-1620, a radiance map $I_\lambda$ 1608 is generated based on the multispectral radiance images 1604. Also, each multispectral radiance image 1604 may be illuminated at only approximately half of its pixels due to the coded pattern. The radiance map $I_\lambda$ 1608 may be generated by combining two mutually complementary multispectral radiance images 1604 and correcting any interreflections (the global component). In some embodiments, the radiance map $I_\lambda$ 1608 at wavelength $\lambda_i$ for a pixel p is generated according to the following:

$$I_{\lambda_i}(p) = I_{\lambda_i}^{(0)}(p) + I_{\lambda_i}^{(1)}(p) - 2 \min(I_{\lambda_i}^{(0)}(p), I_{\lambda_i}^{(1)}(p)).$$

The above equation may be particularly applicable to channels or wavelengths that correspond to relatively-high spatial frequencies.

Finally, in block 1640, a reflectance map $R_\lambda$ 1609 is generated based on the radiance map $I_{\lambda_i}$ 1608 and on the irradiance map $E_{\lambda_i}$ 1607, for example according to $R_{\lambda_i} = I_{\lambda_i}/E_{\lambda_i}$.

Referring again to FIG. 15, some embodiments of block 1520, where a cluster of material-feature vectors is generated, include calculating material-feature vectors for specular pixels based on one or more reflectance maps $R_\lambda$. Some embodiments use the second mask 1612 that is generated in FIG. 16 to determine a region $\Omega$ of pixels where the reflectance map is valid. However, not every pixel in the region is considered specular: in some embodiments, specular indicates a high reflectance value. Specular pixels may be identified by using another threshold $\tau_1$. For example, in some embodiments $\tau_1$=0.3, and a specular pixel is a pixel in $\Omega$ that ranks in the top $\tau_1 \cdot 100\%$ in reflectance value. Thus, some embodiments identify pixels that rank in the top 30% in reflectance value as specular.

Figure 19A:
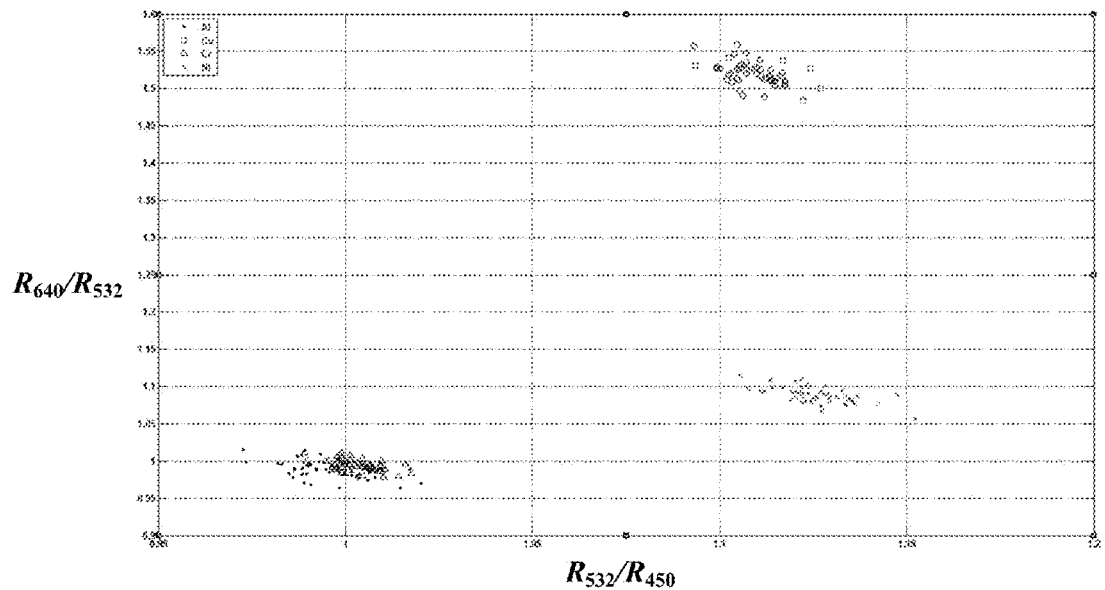
FIGS. 19A and 19B illustrate examples of two-dimensional projections of a three-dimensional material-feature space.
Figure 19B:
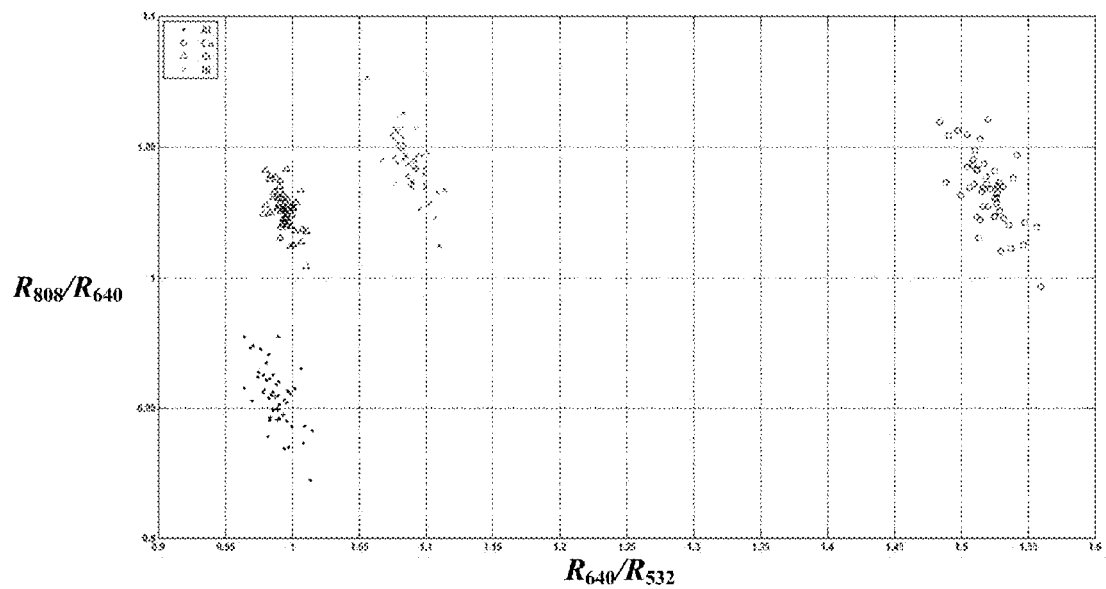

For the identified specular pixels, material-feature vectors are generated. For example, in some embodiments, a material-feature vector is a three-dimensional material-feature vector that includes the following dimensions:

$$(R_{532}(p)/R_{450}(p), R_{640}(p)/R_{532}(p), R_{808}(p)/R_{640}(p)),$$

where p is a specular pixel. Also, material-feature vectors for the specular pixels may tend to form one or more clusters. FIGS. 19A and 19B illustrate examples of two-dimensional projections of the three-dimensional material-feature space. The clusters of material-feature vectors are shown in these examples of two-dimensional projections.

Additionally, in block 1530, where the distance of a cluster of material-feature vectors from a reference material-feature vector (also referred to herein as a "feature vector") is calculated to determine a material type, a reference feature vector may be obtained from physical measurements of the refractive index and the extinction coefficient. For example, a reference feature vector for aluminum can be a vector of the ratios of Fresnel reflectance at normal incidence (i.e., u=1): $(F_{532}(1)/F_{450}(1), F_{640}(1)/F_{532}(1), F_{808}(1)I \quad F_{640}(1))$. The Fresnel reflectance, in this example, can in turn be calculated from a known refractive index and a known extinction coefficient at wavelengths of 450 nm, 532 nm, 640 nm, and 808 nm. A table of example reference feature vectors for some materials is shown below in Table 2:

TABLE 2

| | Reference Feature Vector | | |
|---|---|---|---|
| Al | 0.9942 | 0.9894 | 0.9560 |
| Cu | 1.1099 | 1.5214 | 1.0341 |
| Cr | 1.0029 | 0.9955 | 1.0267 |
| Ni | 1.1270 | 1.0902 | 1.0451 |

For example, some embodiments include a reference feature vector $x_0$ and a cluster $C = \{x_i\}_{i=1, 2, \ldots, K}$ of K material-feature vectors. The Euclidean distances $\|x_i - x_0\|$, i=1, 2, . . . , K between the reference feature vector $x_0$ and the K material-feature vectors in the cluster $C = \{x_i\}_{i=1, 2, \ldots, K}$ are sorted in ascending order of magnitude. Also, another threshold $\tau_2$ is set. For example, in some embodiments $\tau_2$=0.5. The distance function $d(x_0, C)$ may be defined according to the following (where the reordering operation (permutation) that results from the sorting is denoted by $\sigma$):

$$d(x_0, C) = \text{mean } \{\|x_{\sigma(i)} - x_0\| | i \leq \tau_2 \cdot K\}.$$

Thus, in these embodiments, the distance between a reference feature vector and a cluster is the average of the smallest $\tau_2 \cdot 100\%$ (e.g., 50% if $\tau_2=0.5$) of the distances between the individual material-feature vectors in the cluster and the reference feature vector.

Table 3 shows an example of a distance matrix where each row corresponds to a cluster of material-feature vectors of a material sample. For example, the first row corresponds to an aluminum sample, the second row corresponds to a copper sample, the third row corresponds to a chromium sample, and the fourth row corresponds to a nickel sample. These clusters of material-feature vectors are classified against four possible material types, namely aluminum, copper, chromium, and nickel, by calculating the distance between the cluster and the reference feature vectors shown in the previous table. The smallest distance for each sample is highlighted. For each sample, the classification is correct.

TABLE 3

|  | Al type | Cu type | Cr type | Ni type |
| --- | --- | --- | --- | --- |
| Al sample | 0.0104 | 0.5445 | 0.0667 | 0.1856 |
| Cu sample | 0.5389 | 0.0106 | 0.5248 | 0.4189 |
| Cr sample | 0.0659 | 0.5328 | 0.0065 | 0.1552 |
| Ni sample | 0.1836 | 0.4250 | 0.1514 | 0.0095 |

Figure 20:
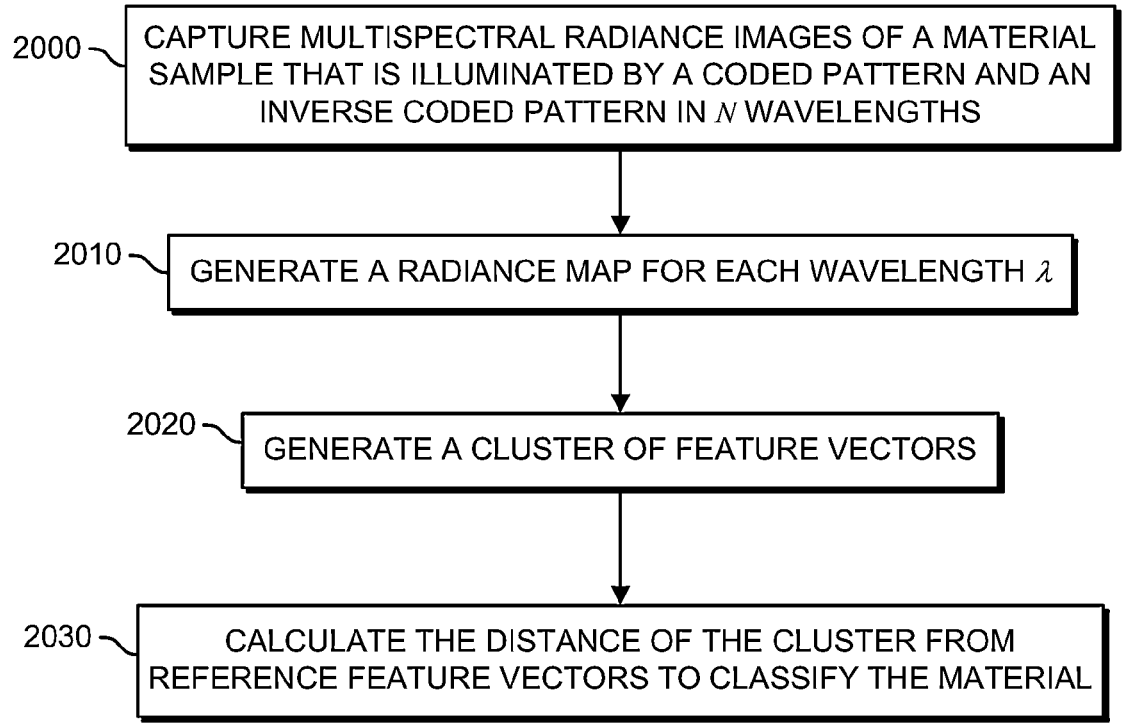
FIG. 20 illustrates an example embodiment of an operational flow for classifying materials.

FIG. 20 illustrates an example embodiment of an operational flow for classifying materials. In block 2000, multi-spectral radiance images of a material sample that is illuminated by a coded pattern and an inverse coded pattern in N wavelengths $\lambda$ are captured. In some embodiments, two stacks of mutually complementary images are captured, and each stack includes N images that correspond to the N wavelengths. Next, in block 2010, a radiance map is generated for each wavelength $\lambda$, for example as described in the description of block 1630 in FIG. 16. The flow then moves to block 2020, where a cluster of material-feature vectors is generated based on one or more of the radiance maps. Finally, in block 2030, the distances of the cluster of material-feature vectors from one or more reference feature vectors are calculated, and the material is classified based on the distances.

In block 2020, instead of using reflectance values to determine specular pixels, a threshold for radiance values is used to determine specular pixels. In some embodiments, this is done in two parts. In the first part, a threshold for radiance is used. This is similar to the threshold $\tau_0$ and the determination of the binary mask $M_1$ described in the description of FIG. 16. After the application of the mask to the multispectral radiance images, only pixels that have a radiance that is above the threshold survive. Then, in the second part, a threshold similar to threshold $\tau_1$ in the description of FIG. 16 is used to retain only pixels with radiance values in the top $\tau_1 \cdot 100\%$ range. The remaining pixels are then identified as specular.

Some of these embodiments may be advantageous, for example if the material sample has a very irregular shape or if accurately determining the surface normal vector is difficult. In these situations it may be advantageous to not determine the reflectance map, which depends on the irradiance map, which in turn depends on the surface normal map. However, because incident irradiance may not be accounted for by some embodiments, the specular pixels may simply have a high radiance and may not correspond to a truly specular reflection.

Figure 21:
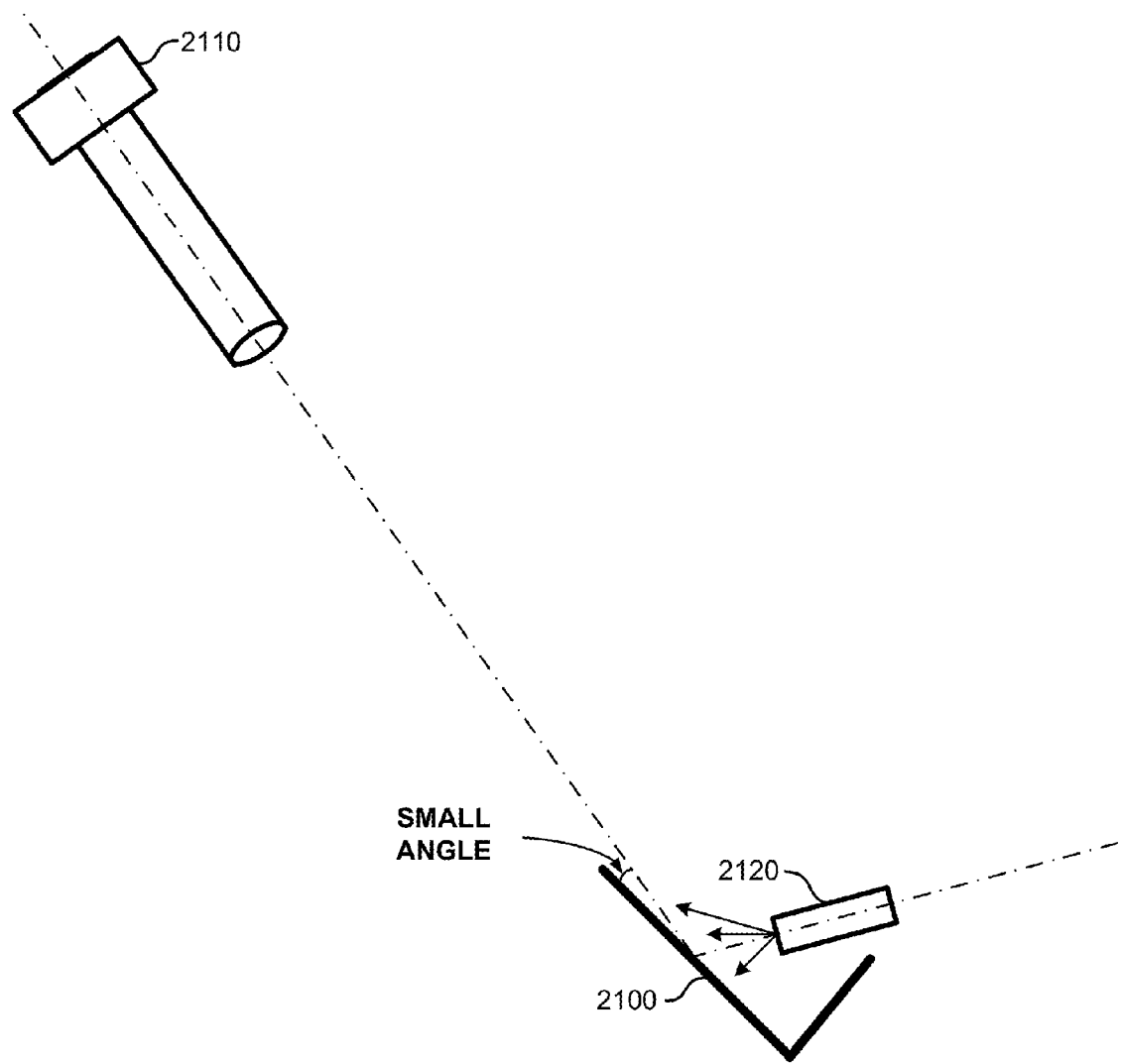
FIG. 21 illustrates an example embodiment of an arrangement of a camera and a projector.

FIG. 21 illustrates an example embodiment of an arrangement of a camera 2110 and a projector 2120. In this example embodiment, the camera 2110 and the projector 2120 are arranged in a geometric configuration that induces a specular reflection at a gracing angle. In the illustrated arrangement, the observation angle is close to 90 degrees from the surface normal vector of a material sample 2100, in contrast to arrangements where the observation angle is closer to 0 degrees from the surface normal vector of the sample (some embodiments include both arrangements of the camera 2110 and the projector 2120).

Figure 22:
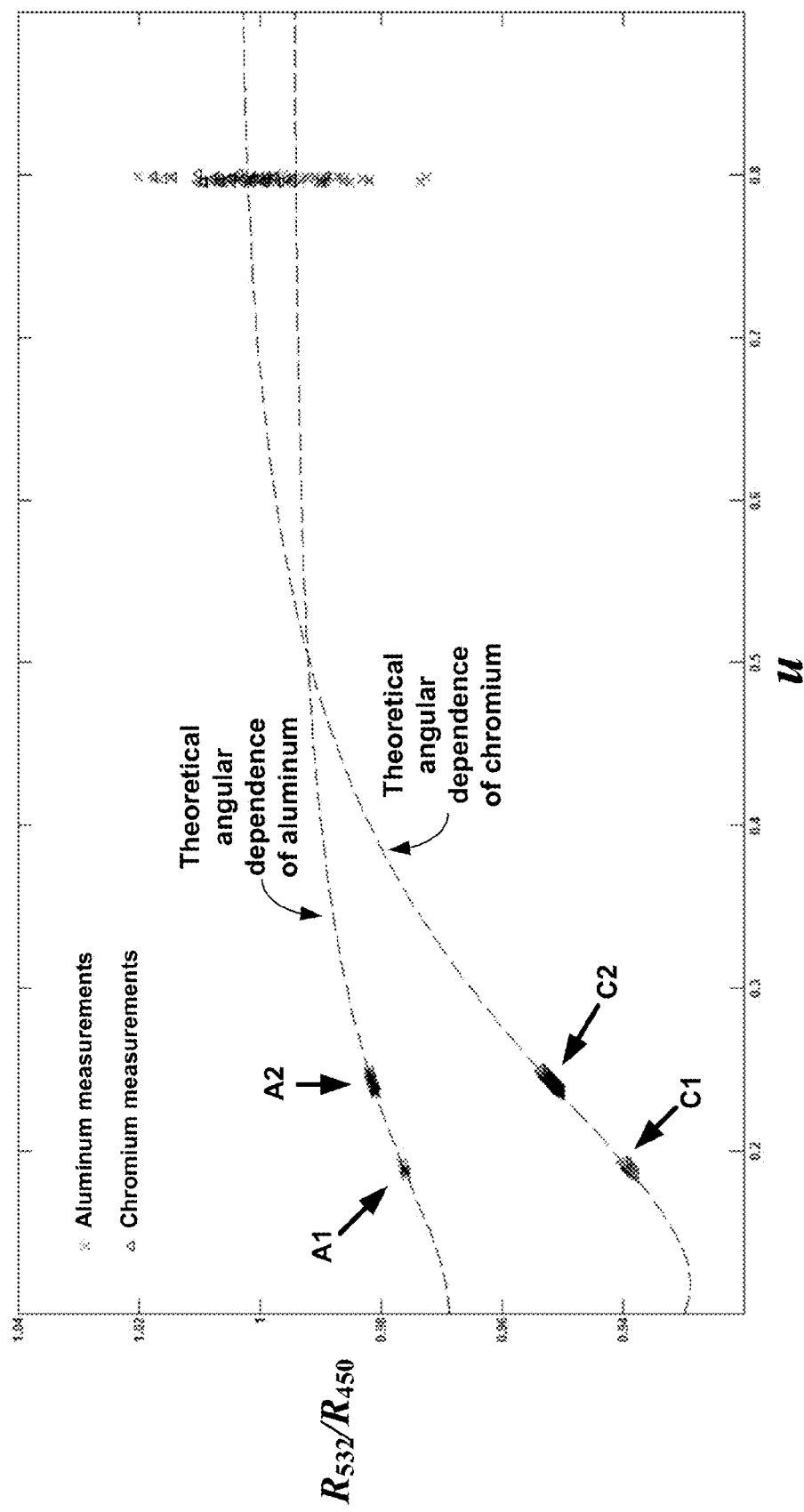
FIG. 22 illustrates examples of feature-value measurements for aluminum and chromium.

This arrangement may be advantageous when, for example, discriminating aluminum and chromium without the use of an NIR wavelength (such as 808 nm). For example, consider the feature value $R_{532}/R_{450}$, which can be determined using visible wavelengths 450 nm and 532 nm. When measurements of this feature value are made at observation angles that are relatively close to the surface normal, the clusters for aluminum and chromium may not be reliably distinguished. However, feature-value measurements at gracing angles may distinguish these metals, as shown in FIG. 22, which illustrates examples of feature-value measurements for aluminum and chromium.

The measurements at near-surface-normal observation angles are shown near u=0.8 (which corresponds approximately to an observation angle of $\cos^{-1}(0.8))=37°$. Also, clusters labeled A1 and C1 are sets of example clusters that correspond to measurements of an aluminum sample and a chromium sample that have identical surface-normal orientations. Clusters labeled A2 and C2 are another set of example clusters that correspond to measurements of an aluminum sample and a chromium sample that have identical surface-normal orientations as each other, but that are different from the first set of examples (so that the u values are different). These feature-value measurements may differentiate aluminum and chromium more easily than the feature-value measurements at near-surface-normal observation angles (e.g., near u=0.8).

Figure 23:
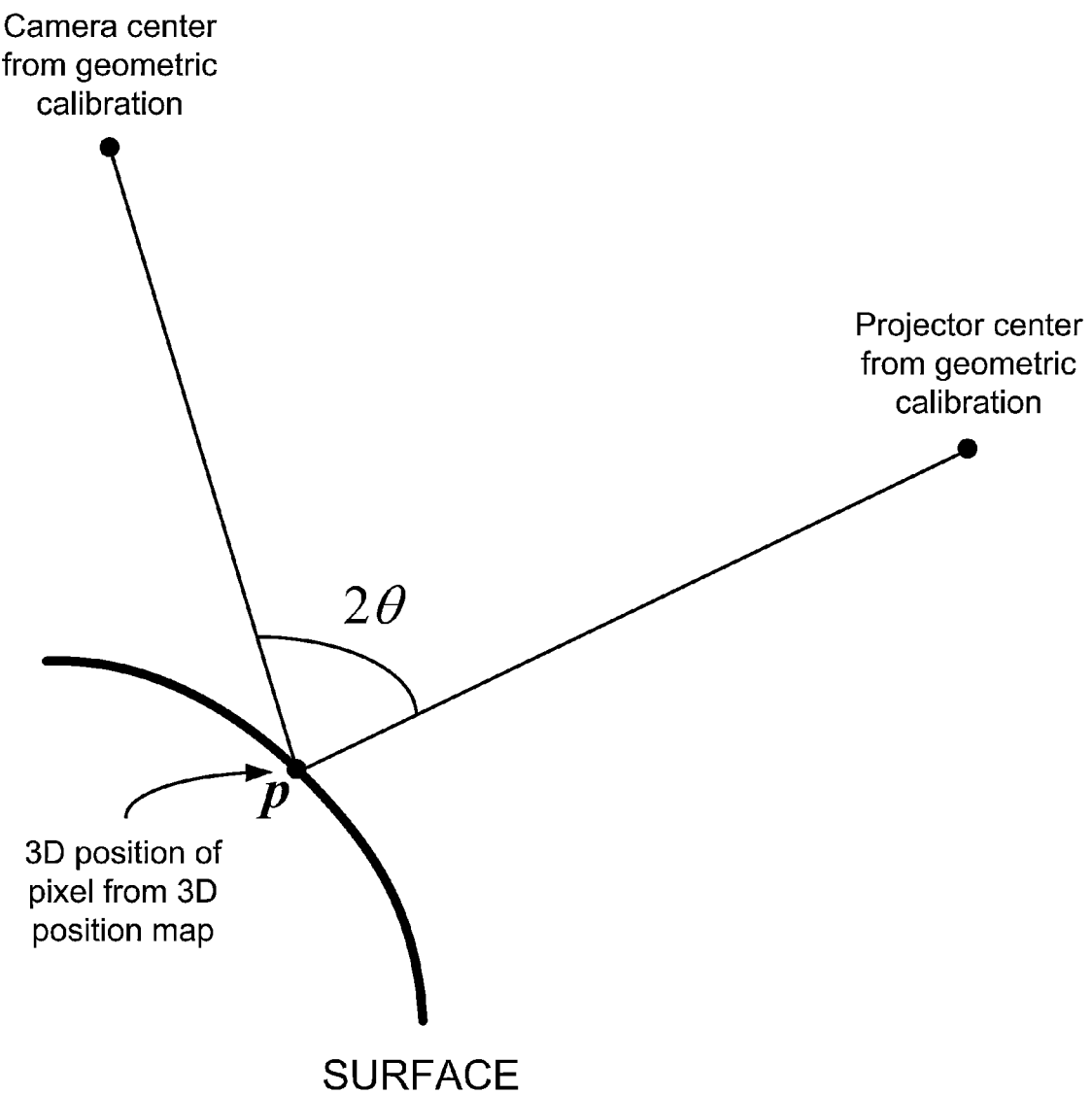
FIG. 23 illustrates the positions that are used to calculate an incident angle.

For example, a set of feature-value measurements that correspond to cluster A1 have been made for a material sample, and the unknown material type is to be determined based on these measurements. The feature value of each point in the cluster, together with its corresponding u value (u is the cosine of half of the angle between the observation direction and the illumination direction), are determined. Based on the three-dimensional position of a pixel and on the positions of the centers of the projector and the camera, u can be determined, as shown in FIG. 23, which illustrates the positions that are used to calculate an incident angle and u. If $v=\cos(2\theta)$ (obtained from the dot product of vectors, for example), then $$u=\cos\theta=\sqrt{(v+1)/2}.$$

The cluster A1 can be used to classify the material sample by finding the closest match to the $R_{532}/R_{450}$ feature-value theoretical curve (which is depicted in FIG. 4A). In this example, the cluster A1 matches the theoretical curve of aluminum better than the theoretical curve of chromium, so the material is classified as aluminum. The classification may be based on a distance function. For example, if $C=\{(u_i, x_i)\}_{i=1, 2, \ldots, K}$ represents a cluster such as A1, where $N_1 \leq N-1$, where $x_i$ is a vector of $N_1$ ratios of measurements in different spectral bands (e.g., the ratios $R_{532}/R_{450}, R_{640}/R_{532}$, and the like); if $C_0=\{(u_i, x_i)\}_{i=1, 2, \ldots, K}$ are reference feature values that depend on an angle, represented by its cosine u; and if $\{x_i\}_{i=1, 2, \ldots, K}$ are evaluated at the corresponding angular locations $\{u_i\}_{i=1, 2, \ldots, K}$, then the distance of the cluster C from the reference feature values $C_0$ may be defined as follows:

$$d(C, C_0) = \frac{1}{K} \sum_{i=1}^{K} \|x_i - X_i\|.$$

Figure 24:
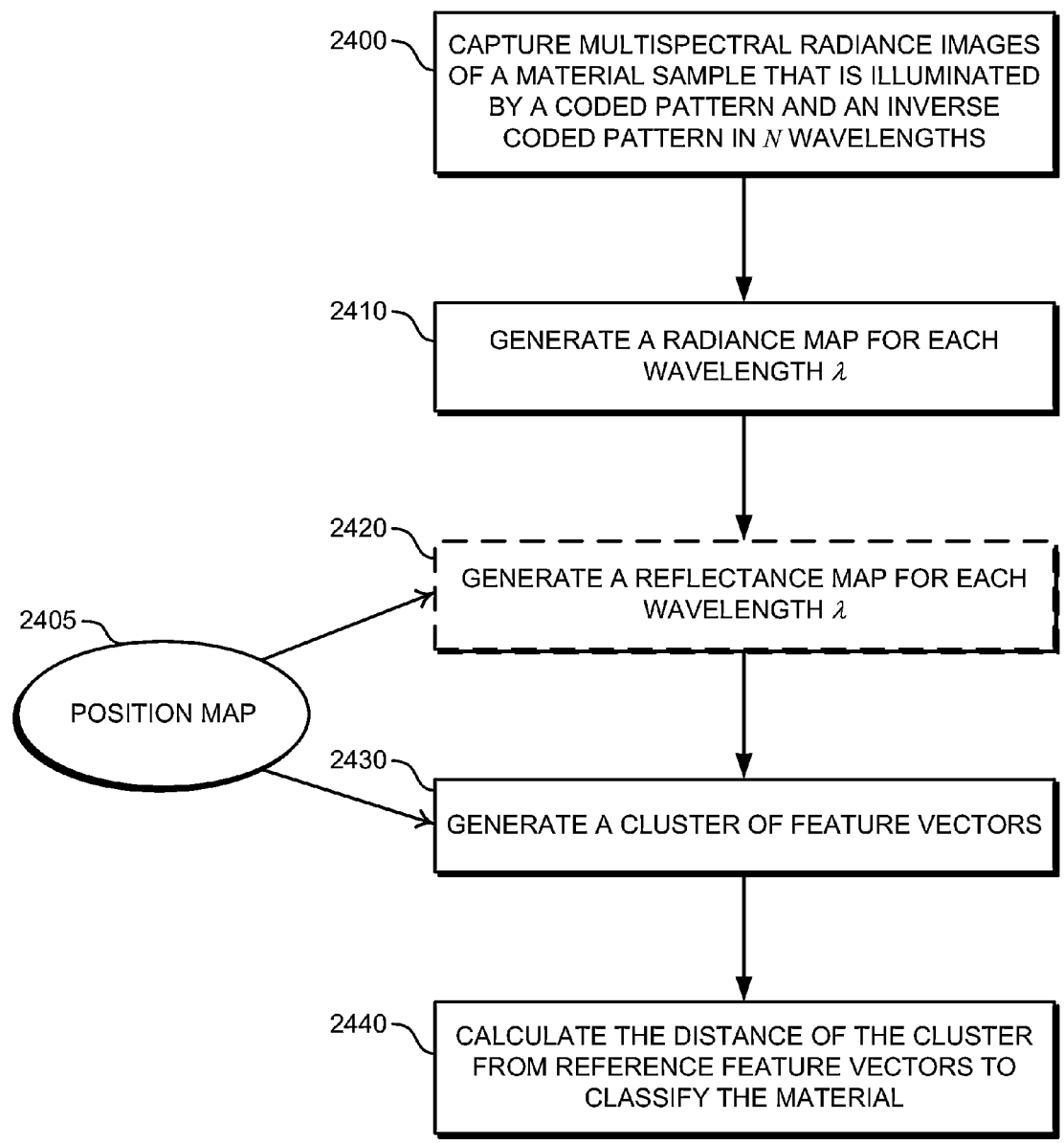
FIG. 24 illustrates an example embodiment of an operational flow for classifying materials.

FIG. 24 illustrates an example embodiment of an operational flow for classifying materials. This example embodiment does not determine the position map from the multispectral radiance images and instead obtains the position map from another source. The other source may be, for example, prior knowledge of the shape of a material sample, a structured light system, or a photometric stereo system. Block 2400 is identical to or similar to block 1500 of FIG. 15 or block 2000 of FIG. 20. In some embodiments, N is chosen to be relatively small, for example N=3. Such embodiments may be implemented with a relatively standard RGB projector (e.g., a multichannel projector that is an RGB projector) that has monochromatic channels, such as wavelengths of 450 nm, 532 nm, and 640 nm, and the camera can be a relatively standard RGB camera (e.g., the multispectral camera is an RGB camera). The coded pattern and its inverse pattern can be patterns that have relatively-high spatial frequencies (e.g., a checkerboard pattern). The same patterns may be used in each of the projector channels. Block 2410 is identical to or similar to block 2010 in FIG. 20. As described earlier, the use of relatively-high spatial-frequency patterns, mutually-inverse patterns, or complementary patterns produces two mutually complementary radiance images, which can be combined to correct interreflections (correcting interreflections may include determining the global component of the illumination). The operations in block 2420, which are similar or identical to the operations in block 1510 of FIG. 15, are not included in some embodiments. For example, the operations may be performed if the embodiment of the operational flow is similar to the embodiment of FIG. 15 or may be skipped if the embodiment of the operational flow is similar to the embodiment of FIG. 20.

When the operations in block 2420 are performed, they may be similar to the operations in the operational flow in FIG. 16, with the following differences: First, one or more radiance maps have already been generated in block 2410, so the operations may not include generating a radiance map based on multispectral radiance images, as performed in block 1630. Second, the position map is available from an external source, so the operations may not include generating of a position map based on multispectral radiance images, as performed in block 1600.

Next, block 2430 is identical to or similar to block 1520 in FIG. 15 or block 2020 in FIG. 20. The operations in block 2430 may also use the position map from the external source, for example when used in conjunction with the example embodiment of FIG. 23. Finally, block 2440 is identical to or similar to block 1530 in FIG. 15 or to block 2030 in FIG. 20. Some of these embodiments require only a relatively standard RGB projector for the projector, only a relatively standard RGB camera for the camera, and capturing only two RGB images.

Figure 25:
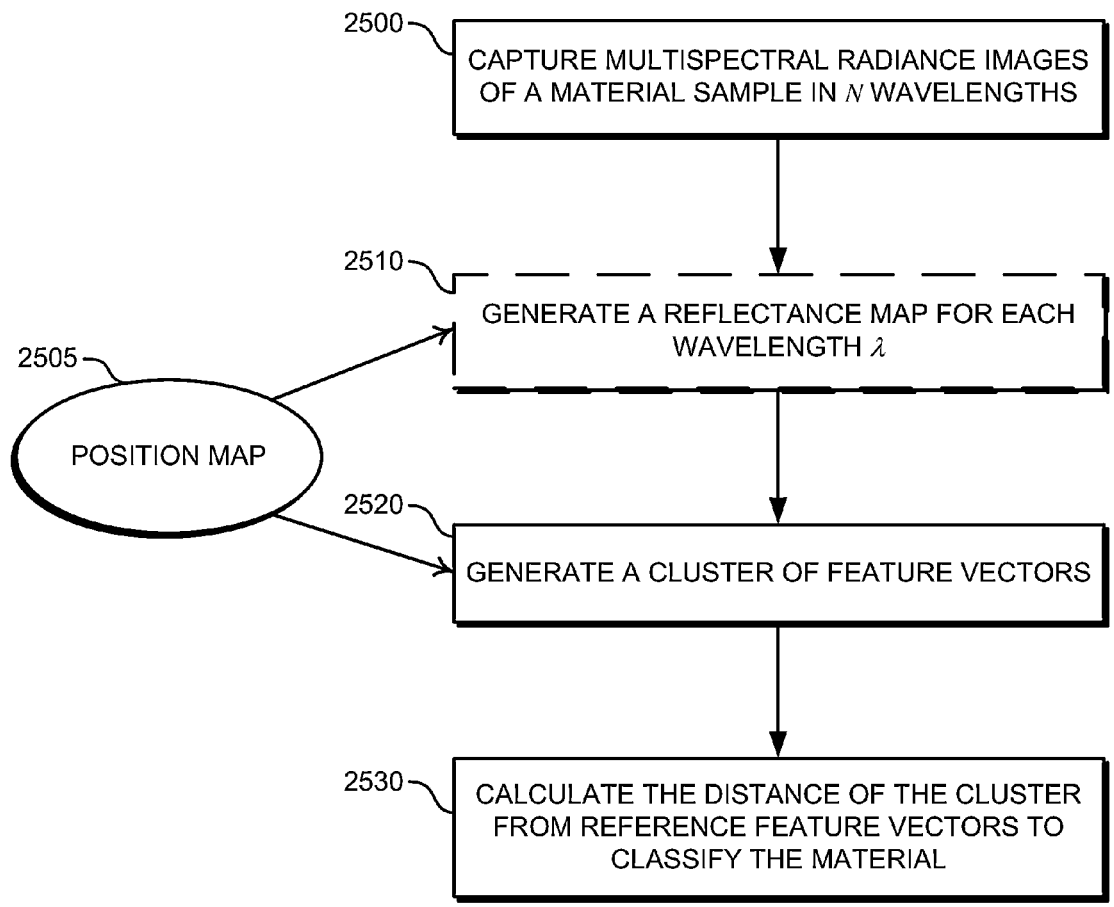
FIG. 25 illustrates an example embodiment of an operational flow for classifying materials.

FIG. 25 illustrates an example embodiment of an operational flow for classifying materials. This example embodiment also does not determine the position map from the multispectral radiance images, and instead obtains the position map from another source. Also, this embodiment does not use mutually inverse coded patterns, and the three-dimensional position information is obtained from a different source than spectral structured light. This may be particularly applicable when the shape of a sample is convex or when the interreflections of light are otherwise negligible. Also, in some embodiments of this operational flow, N is chosen to be relatively small, for example N=3. Such embodiments may be implemented with a relatively standard RGB projector (e.g., the multichannel projector is an RGB projector) that has monochromatic channels, such as wavelengths of 450 nm, 532 nm, and 640 nm, and the camera can be a relatively standard RGB camera (e.g., the multispectral camera is an RGB camera). In some of these embodiments, in block 2500, each pixel of the projector is turned on simultaneously to illuminate the sample, and the resulting scene is captured to produce a radiance map in N wavelengths. If N=3, this is an RGB radiance image. Block 2510 is identical to or similar to block 2420 in FIG. 24 or to block 1510 of FIG. 15. Block 2520 is identical to or similar to block 2430 in FIG. 24, block 1520 in FIG. 15, or block 2020 in FIG. 20. Finally block 2530 is identical to or similar to block 2440 in FIG. 24, block 1530 in FIG. 15, and block 2030 in FIG. 20. Some of these embodiments also require only a relatively standard RGB projector for the projector, only a relatively standard RGB camera for the camera, and capturing only one RGB image.

Some of the embodiments of the systems, methods, and devices that are described herein may be combined. For example, some embodiments include multiple cameras at different observation angles, some of which may perform observation at a normal direction and some of which may perform observation at a gracing angle, and which may be arranged around the sample to simultaneously perform observation of the sample. Also, in some embodiments one or more cameras are moved to different angles at different times. Similarly, some embodiments include multiple projectors that provide illumination from different illumination angles, and some embodiments include one or more projectors that move to different illumination angles at different times.

The above-described devices, systems, and methods can be implemented by providing one or more computer-readable media that contain computer-executable instructions for realizing the above-described operations to one or more computing devices that are configured to read and execute the computer-executable instructions. Thus, the systems or devices perform the operations of the above-described embodiments when executing the computer-executable instructions. Also, an operating system on the one or more systems or devices may implement at least some of the operations of the above-described embodiments. Thus, the computer-executable instructions or the one or more computer-readable media that contain the computer-executable instructions constitute an embodiment.

Any applicable computer-readable medium (e.g., a magnetic disk (including a floppy disk, a hard disk), an optical disc (including a CD, a DVD, a Blu-ray disc), a magneto-optical disk, a magnetic tape, and semiconductor memory (including flash memory, DRAM, SRAM, a solid state drive, EPROM, EEPROM)) can be employed as a computer-readable medium for the computer-executable instructions. The computer-executable instructions may be stored on a computer-readable storage medium that is provided on a function-extension board inserted into a device or on a function-extension unit connected to the device, and a CPU provided on the function-extension board or unit may implement at least some of the operations of the above-described embodiments.

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

What is claimed is:

1. A method for classifying a sample by material type, the method comprising:
obtaining measurements of reflections from a sample in at least two spectral bands at respective illumination angles and respective observation angles, wherein the measurements of reflections are obtained from one or more cameras, wherein the at least two spectral bands include a first spectral band and a second spectral band, wherein one or more projectors illuminate the sample in the first spectral band at a first illumination angle, wherein the one or more projectors illuminate the sample in the second spectral band at a second illumination angle, and wherein the first illumination angle is different from the second illumination angle;
identifying, with one or more computing devices, specular measurements in the at least two spectral bands; and
calculating, with the one or more computing devices, a feature value for the sample based on a ratio value of a specular measurement in a first spectral band of the at least two spectral bands to a specular measurement in a second spectral band of the at least two spectral bands.

2. The method of claim 1, wherein identifying the specular measurements in the at least two spectral bands includes
generating an irradiance map of the measurements of the reflections from the sample; and
generating a reflectance map of the measurements of the reflections from the sample based on the irradiance map.

3. The method of claim 1, wherein the measurements of the reflections in the at least two spectral bands at the respective illumination angles and the respective observation angles are measurements of a bidirectional reflectance distribution function.

4. The method of claim 2, wherein generating the reflectance map of the image includes generating a measurement of reflected radiance.

5. The method of claim 1, wherein calculating the feature value for the sample is further based on a ratio value of the specular measurement in the first spectral band of the at least two spectral bands to a specular measurement in a third spectral band of the at least two spectral bands.

6. The method of claim 1, further comprising classifying the sample based on the feature value, wherein classifying the sample based on the feature value includes matching the feature value with predetermined reference feature values for different material types from a database of reference feature values.

7. The method of claim 1, wherein the sample is a metal sample.

8. The method of claim 1, wherein the spectral bands are each a single wavelength.

9. The method of claim 8, wherein the single wavelengths include one or more of 450 nanometers, 532 nanometers, 640 nanometers, and 808 nanometers.

10. The method of claim 1, wherein the spectral bands are each a broadband.

11. The method of claim 1, wherein the spectral bands include one or more of a visible range of a light spectrum and a near-infrared range of the light spectrum.

12. The method of claim 2, wherein generating the irradiance map of the measurements of the reflections from the sample includes
generating a position map of surface points of the sample based on the measurements of the reflections from the sample in the at least two spectral bands, on the respective illumination angles, and on the respective observation angles, and
generating a surface-normal vector map based on the position map.

13. A system for classifying a sample by material type, the system comprising:
one or more projectors configured to project light in at least two spectral bands;
one or more cameras configured to capture images;
one or more computer-readable media; and
one or more processors that are coupled to the one or more computer-readable media and that are configured to cause the system to
obtain, from the one or more cameras, measurements of reflections from a sample in at least two spectral bands, wherein the one or more cameras detected the measurements of the reflections at respective observation angles, wherein the at least two spectral bands include a first spectral band and a second spectral band, wherein the one or more projectors illuminate the sample in the first spectral band at a first illumination angle, wherein the one or more projectors illuminate the sample in the second spectral band at a second illumination angle, and wherein the first illumination angle is not equal to the second illumination angle;
identify a first specular measurement of the first spectral band of the at least two spectral bands in the measurements of the reflections from the sample;
identify a second specular measurement of the second spectral band of the at least two spectral bands in the measurements of the reflections from the sample; and
calculate a feature value for the sample according to a homogenous function, using the first specular measurement and the second specular measurement as inputs to the homogenous function.

14. The system of claim 13, wherein the one or more processors are further configured to cause the system to
identify a third specular measurement of a third spectral band of the at least two spectral bands in the measurements of the reflections from the sample;
calculate two or more different feature values according to the homogenous function, using at least the third specular measurement and using one or more of the first specular measurement and the second specular measurement as inputs to the homogenous function; and
classify the sample based on the feature value by using a multi-dimensional feature space composed of the feature value and the two or more different feature values.

15. The system of claim 13,
wherein the one or more projectors are multi-channel projectors;
wherein the one or more cameras are multispectral cameras;
wherein the one or more processors are further configured to cause the system to
illuminate the sample using the one or more multi-channel projectors, and
observe the sample using the one or more multispectral cameras; and
wherein to obtain the measurements of the reflections, the one or more processors are configured to cause the system to capture images of the sample using the one or more multispectral cameras while the sample is illuminated by the one or more multi-channel projectors.

16. The system of claim 15, wherein, to identify the first specular measurement, the one or more processors are further configured to cause the system to generate an irradiance map of the sample; and
generate a reflectance map of the sample based on the irradiance map and on the measurements of the reflections from the sample.

17. The system of claim 16, wherein to generate the irradiance map of the sample, the one or more processors are further configured to cause the system to
generate a position map of surface points of the sample based on the measurements of the reflections from the sample, on the first illumination angle, and on an observation angle of the respective observation angles; and
generate a surface-normal vector map based on the position map.

18. The system of claim 15, wherein at least one multi-channel projector of the one or more multi-channel projectors is configured to project a coded pattern in two or more spectral channels, and at least one multispectral camera of the one or more multispectral cameras is configured to capture the coded pattern in each of the two or more spectral channels.

19. The system of claim 18, wherein a spatial frequency of the coded patterns in the two or more spectral channels is different in each channel.

20. The system of claim 18, wherein the at least two spectral bands of the reflections from the sample correspond to the two or more spectral channels with coded patterns, and
wherein the spatial frequencies of the coded patterns can be resolved by at least one multispectral camera of the one or more multispectral cameras.

21. The system of claim 13, wherein the homogenous function includes a ratio of the first specular measurement to the second specular measurement.

22. The system of claim 13, wherein the one or more processors are further configured to cause the system to
identify respective specular measurements and calculate a respective feature value for multiple surface points of the sample, thereby generating multiple feature values, and
form the multiple feature values for the multiple surface points of the sample into a cluster.

23. The system of claim 22, wherein the one or more processors are further configured to cause the system to classify the sample based on a calculated distance of the cluster from each of one or more reference feature values in a predetermined database of reference feature values, and wherein a match corresponds to a shortest distance.

24. A method of classifying a sample by material type, the method comprising:
obtaining a first image of a sample from one or more cameras, wherein the first image was captured at a first observation angle while the sample was illuminated at a first illumination angle in a first spectral band by one or more projectors;
obtaining a second image of the sample from the one or more cameras, wherein the second image was captured at a second observation angle while the sample was illuminated at a second illumination angle in a second spectral band by the one or more projectors, wherein the first observation angle and the second observation angle are not equal, and wherein the first illumination angle and the second illumination angle are not equal;
identifying, with a computing device, a first specular pixel in the first image of the sample;
identifying, with the computing device, a second specular pixel in the second image of the sample;
calculating, with the computing device, a feature value for the sample based on a ratio value, wherein the ratio value is based on a ratio of a value of the first specular pixel to a value of the second specular pixel; and
classifying the sample, with the computing device, based on the feature value and on candidate feature values that were obtained from a database.

25. The method of claim 24, further comprising:
obtaining a third image of the sample from the one or more cameras, wherein the third image was captured while the sample was illuminated in a third spectral band; and
identifying, with the computing device, a third specular pixel in the third image of the sample,
wherein calculating the feature value for the sample is further based on a second ratio value, wherein the second ratio value is based on a ratio of the value of the first specular pixel to a value of the third specular pixel.

26. The method of claim 24, further comprising:
obtaining a third image of the sample from the one or more cameras, wherein the third image was captured while the sample was illuminated in a third spectral band; and
identifying, with the computing device, a third specular pixel in the third image of the sample,
wherein the ratio value is further based on a ratio of the value of the first specular pixel to a geometric mean of the value of the second specular pixel and a value of the third specular pixel.

* * * * *